US007233685B2

(12) United States Patent
Miyasaka et al.

(10) Patent No.: US 7,233,685 B2
(45) Date of Patent: Jun. 19, 2007

(54) INFORMATION DEVICE AND DISPLAY CONTROL METHOD

(75) Inventors: Mitsutoshi Miyasaka, Suwa (JP); Tomio Ikegami, Chino (JP)

(73) Assignee: Seiko Epson Corporation, Tokyo (JP)

( * ) Notice: Subject to any disclaimer, the term of this patent is extended or adjusted under 35 U.S.C. 154(b) by 756 days.

(21) Appl. No.: 10/653,170

(22) Filed: Sep. 3, 2003

(65) Prior Publication Data
US 2004/0096086 A1    May 20, 2004

(30) Foreign Application Priority Data
Sep. 6, 2002    (JP) ............................. 2002-261517

(51) Int. Cl.
G06K 9/00    (2006.01)
(52) U.S. Cl. ...................... 382/124; 382/125; 340/5.53
(58) Field of Classification Search ................ 382/124, 382/125, 126, 127, 115, 116, 272, 266, 195, 382/228, 289, 296, 205; 356/71; 340/5.53; 235/380; 283/69; 427/1
See application file for complete search history.

(56) References Cited

U.S. PATENT DOCUMENTS

| 4,185,270 A | * | 1/1980 | Fischer, II et al. ........... 382/125 |
| 4,790,564 A | * | 12/1988 | Larcher et al. ................ 283/69 |
| 4,792,226 A | * | 12/1988 | Fishbine et al. ............... 356/71 |
| 4,896,363 A | * | 1/1990 | Taylor et al. ................. 382/125 |
| 5,493,621 A | | 2/1996 | Matsumura et al. |
| 6,002,787 A | * | 12/1999 | Takhar et al. ................ 382/125 |
| 6,072,895 A | | 6/2000 | Bolle et al. |
| 6,166,370 A | | 12/2000 | Sayag |
| 6,501,846 B1 | * | 12/2002 | Dickinson et al. ........... 382/124 |
| 6,580,816 B2 | * | 6/2003 | Kramer et al. ............... 382/124 |
| 6,603,462 B2 | * | 8/2003 | Matusis ....................... 345/173 |
| 6,980,669 B1 | * | 12/2005 | Uchida ......................... 382/115 |
| 7,035,441 B2 | * | 4/2006 | Bergenek et al. ............ 382/124 |

FOREIGN PATENT DOCUMENTS

| EP | 0 593 386 A2 | 4/1994 |
| EP | 0 973 123 A1 | 1/2000 |

(Continued)

OTHER PUBLICATIONS

U.S. Appl. No. 10/654,443, filed Sep. 4, 2003, Sato et al.
U.S. Appl. No. 10/654,423, filed Sep. 4, 2003, Sato et al.
U.S. Appl. No. 10/665,418, filed Sep. 22, 2003, Sato.
K. Asai et al.; "Automatic Fingerprint Identification"; *Imaging Applications for Automated Industrial Inspection and Assembly*; Proceedings of the Society of Photo-Optical Instrumentation Engineers; Apr. 19-20, 1979; SPIE vol. 182; pp. 49-56.

(Continued)

*Primary Examiner*—Sheela Chawan
(74) *Attorney, Agent, or Firm*—Oliff & Berridge, PLC

(57) ABSTRACT

In an information device, a fingerprint image capture section captures a fingerprint image of an operator. When a fingerprint image captured by the fingerprint image capture section is referred to as a first fingerprint image and a fingerprint image captured at a given time interval after the first fingerprint image is captured is referred to as a second fingerprint image, a comparison section compares minutiae points of the first and second fingerprint images extracted by a minutiae point extraction section. An image generation section generates image information which is changed while reflecting the comparison results of the comparison section. A display section displays an image based on the image information generated by the image generation section. The information device may be provided with a check section, and display control by the display section may be performed after a fingerprint image is checked by the check section.

25 Claims, 23 Drawing Sheets

FOREIGN PATENT DOCUMENTS

| | | |
|---|---|---|
| JP | A-04-158434 | 6/1992 |
| JP | A 06-187089 | 7/1994 |
| JP | A 07-134630 | 5/1995 |
| JP | A 10-161628 | 6/1998 |
| JP | A 2000-148376 | 5/2000 |
| TW | 363174 | 7/1999 |
| TW | 424207 | 3/2001 |
| WO | WO 97/43607 A1 | 11/1997 |

OTHER PUBLICATIONS

Dinesh P. Mital et al.; "An Automated Matching Technique for Fingerprint Identification"; *IEEE*; First International Conference on Knowledge-Based Intelligent Electronic Systems; May 21-23, 1997; pp. 142-147.

* cited by examiner

FIG. 15A
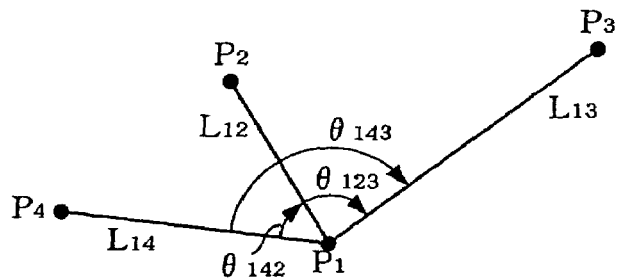
FIG. 15B
| MINUTIAE POINT | ASSOCIATED INFORMATION |
|---|---|
| $P_1$ | $(L_{12}, L_{13}, L_{14}, \theta_{123}, \theta_{142}, \theta_{143})$ |
FIG. 15C
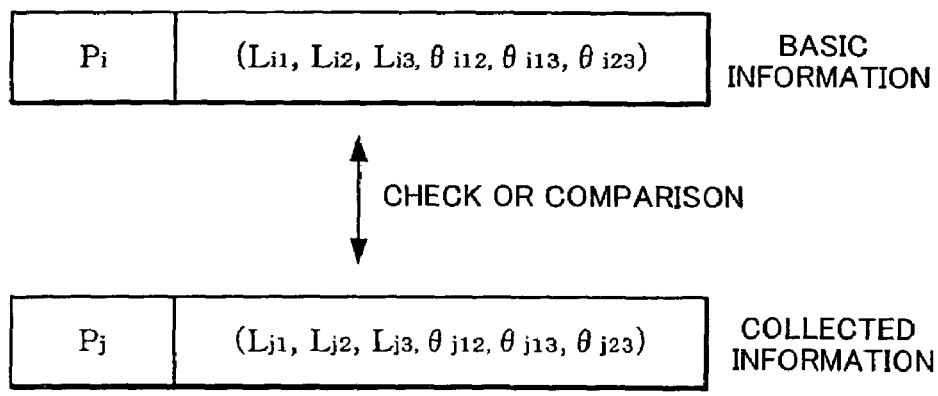

FIG. 16

| MINUTIAE POINT | INNER PRODUCT |
|---|---|
| $P_1$ | $IP_{123} = L_{12} \cdot L_{13} \cdot \cos \theta_{123}$ |
| | $IP_{142} = L_{14} \cdot L_{12} \cdot \cos \theta_{142}$ |
| | $IP_{143} = L_{14} \cdot L_{13} \cdot \cos \theta_{143}$ |

| MINUTIAE POINT | RIDGE INFORMATION |
|---|---|
| P | ( 0, 4 ) |
| P' | ( 0, 6 ) |
| P'' | ( 4, 6, 2, 3 ) |
| ⋮ | ⋮ |

INFORMATION DEVICE AND DISPLAY CONTROL METHOD

Japanese Patent Application No. 2002-261517 filed on Sep. 6, 2002, is hereby incorporated by reference in its entirety.

BACKGROUND OF THE INVENTION

The present invention relates to an information device and a display control method.

In information devices including a display section, various types of control (operations) are performed by designating a position on a menu screen or moving a pointer on a screen. The information device may be controlled by specifying coordinates on a panel having conductors disposed in the shape of a matrix by using an input indicator having a tuning circuit, for example (see Japanese Patent Application Laid-open No. 7-134630). In this case, current is caused to flow through two arbitrary conductors in the X direction or Y direction disposed in the shape of a matrix, and a position designated on the panel is specified by a voltage generated by magnetic coupling between the tuning circuit inside the input indicator and the conductors. The information device is controlled by using the position specified as instruction information.

BRIEF SUMMARY OF THE INVENTION

According to a first aspect of the present invention there is provided an information device comprising:

a fingerprint image capture section which captures a fingerprint image;

a comparison section which compares a first fingerprint image captured by the fingerprint image capture section with a second fingerprint image captured by the fingerprint image capture section at a given time interval after the first fingerprint image is captured;

an image generation section which generates an image based on the comparison result of the comparison section; and a display section which displays the image generated by the image generation section.

According to a second aspect of the present invention there is provided an information device comprising:

a fingerprint image capture section which captures a fingerprint image;

a comparison section which compares a minutiae point of a first fingerprint image captured by the fingerprint image capture section with a minutiae point of a second fingerprint image captured by the fingerprint image capture section at a given time interval after the first fingerprint image is captured;

an image generation section which generates an image, the comparison result of the comparison section causing the image to be scrolled or a pointer on the image to move; and a display section which displays the image generated by the image generation section.

According to a third aspect of the present invention there is provided an information device comprising:

a fingerprint image capture section which captures a fingerprint image; and a comparison section which compares a minutiae point of a first fingerprint image captured by the fingerprint image capture section with a minutiae point of a second fingerprint image captured by the fingerprint image capture section at a given time interval after the first fingerprint image is captured, wherein a function of the information device is controlled based on the comparison result of the comparison section.

According to a fourth aspect of the present invention there is provided an information device comprising:

a fingerprint image capture section which captures a fingerprint image;

a check section which checks registration information which has been previously registered with a first fingerprint image captured by the fingerprint image capture section; and a comparison section which compares a minutiae point of a first fingerprint image captured by the fingerprint image capture section with a minutiae point of a second fingerprint image captured by the fingerprint image capture section at a given time interval after the first fingerprint image is captured, when the check section has determined that the first fingerprint image is identical with the registration information, wherein a function of the information device is controlled based on the comparison result of the comparison section.

According to a fifth aspect of the present invention, there is provided a display control method which controls a display section by means of a captured fingerprint image, the display control method comprising:

capturing a first fingerprint image and then a second fingerprint image at a given time interval after the capture of the first fingerprint image;

comparing the first and second fingerprint images; and changing a display image based on the comparison result of the first and second fingerprint images.

BRIEF DESCRIPTION OF THE SEVERAL VIEWS OF THE DRAWING

FIG. 15A is a diagram showing three line segments provided with a minutiae point as an initial point; FIG. 15B is a table showing lengths of the three line segments and angles formed by the three line segments associated with a minutiae point; and FIG. 15C is a table showing basic information and collected information.

FIG. 16 is a table showing inner products obtained by two line segments and associated with a minutiae point.

DETAILED DESCRIPTION OF THE EMBODIMENT

Embodiments of the present invention are described below. Note that the embodiments described hereunder do not in any way limit the scope of the invention defined by the claims laid out herein. Note also that all of the elements described below should not be taken as essential requirement to the present invention.

Accompanied by progress of integration technology and mounting technology and the like, portable information equipment (information device in a broad sense) such as an IC card, a personal digital assistant (hereinafter abbreviated as PDA), a personal computer, and a portable telephone has been used. Since portability is important for such information equipment, reduction of the size and weight of the information equipment and reduction of power consumption are necessary.

However, it is difficult to drive information equipment using the input device disclosed in Japanese Patent Application Laid-open No. 7-134630 for a long period of time by using a battery. Moreover, since the input indicator must be used, it is difficult to reduce the size and weight of the information equipment. Therefore, it is difficult to mount the input device disclosed in Japanese Patent Application Laid-open No. 7-134630 on portable information equipment.

Accompanied by development of the information-oriented society, personal information has been handled in the portable information equipment. Therefore, the necessity for security protection of the portable information equipment has increased. Therefore, it is desirable to increase the degree of security protection by preventing the portable information equipment from being controlled by a person other than the verified person.

According to the following embodiments, an information device capable of controlling the display of a display section with high accuracy by using a simple configuration and a display control method can be provided.

According to the following embodiments, an information device capable of controlling the display of a display section while increasing the degree of security protection and a display control method can be provided.

The embodiments of the present invention are described below in detail with reference to the drawings.

1. Information Device

Figure 1:
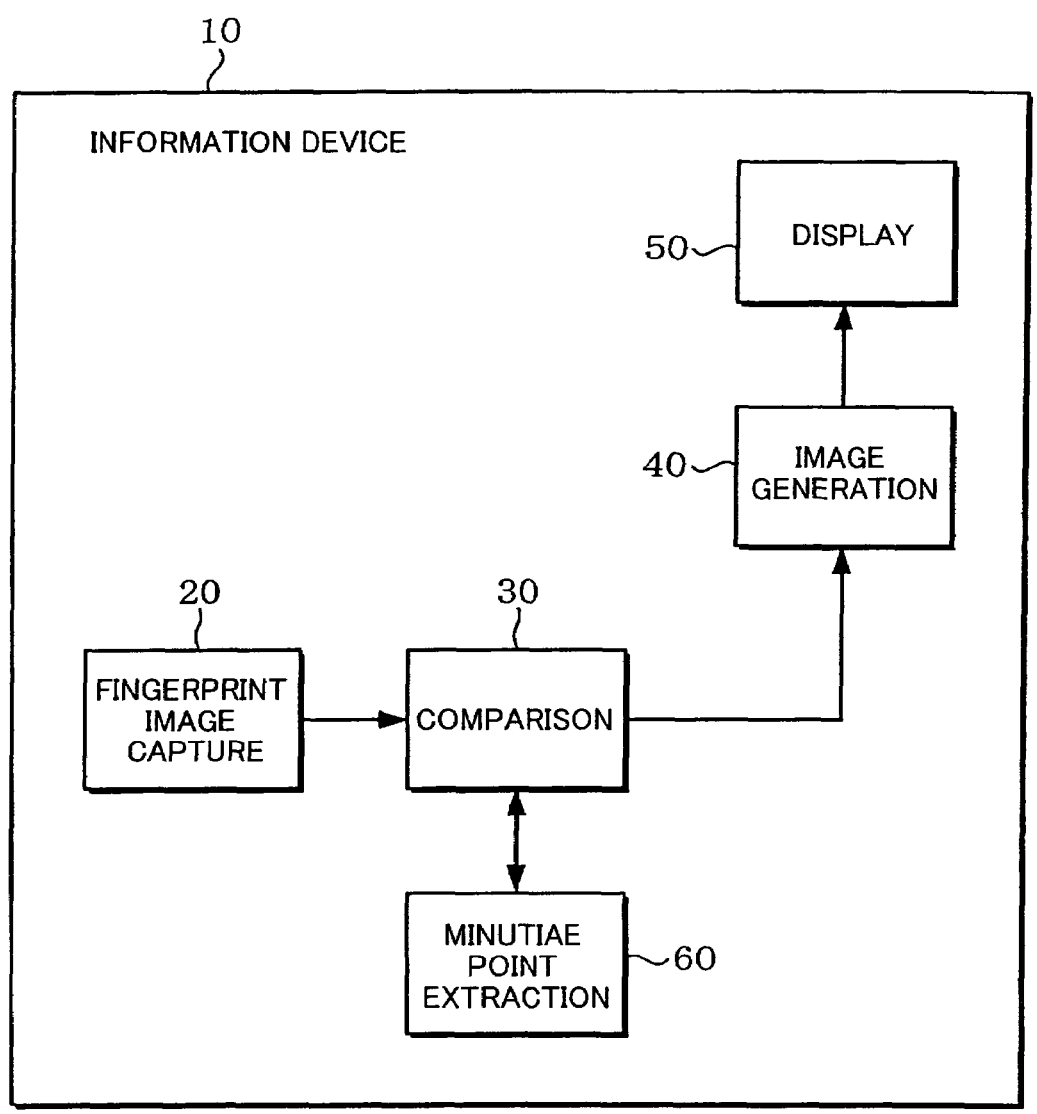
FIG. 1 is a block diagram schematically showing a configurational example of an information device.

FIG. 1 schematically shows a configurational example of an information device.

The present embodiment relates to an information device having a personal verification function and an information display function. As examples of such an information device, information devices for which security protection is important and include an information display section such as a display, such as a personal computer (PC), a personal digital assistant (PDA), an IC card, and a portable telephone, can be given. The information device may be applied to an IC card including an integrated circuit (IC) as portable information equipment, for example. The IC card is used as various types of cards such as a credit card or a cash card.

An information device 10 includes a fingerprint image capture section 20, a comparison section 30, an image generation section 40, and a display section 50. The information device 10 may further include a minutiae point extraction section 60.

The fingerprint image capture section 20 captures a fingerprint image of an operator (user) of the information device 10. The fingerprint image capture section 20 is capable of capturing the fingerprint images at least twice. The fingerprint image capture section 20 may be formed to repeatedly capture the fingerprint images at a given frequency, for example. As the fingerprint image capture section 20, a fingerprint sensor which detects a fingerprint by using various methods may be used. The fingerprint sensor is preferably small taking into consideration that the information device 10 is applied to the portable information equipment.

In the case where a fingerprint image captured by the fingerprint image capture section 20 is referred to as a first fingerprint image and a fingerprint image captured at a given time interval after the first fingerprint image is captured is referred to as a second fingerprint image, the comparison section 30 compares the first fingerprint image with the second fingerprint image. The comparison section 30 detects the deviation and the like of the second fingerprint image with respect to the first fingerprint image as the moving direction, moving distance, and rotational angle, for example.

The image generation section 40 generates image information displayed in the display section 50. The image generation section 40 is capable of generating the image information which is changed while reflecting comparison results (detection results) of the comparison section 30. For example, the image generation section 40 scrolls the information displayed in the display section 50 or moves a pointer (arrow) displayed in the display section 50 corresponding to the movement of the finger. The comparison section 30 and the image generation section 40 may be realized by a microcomputer, DSP, or dedicated IC chip which executes a given program stored in a memory, for example.

The display section 50 displays an image based on the image information generated by the image generation section 40. A liquid crystal panel may be used as the display section 50, for example. In this case, the display section 50 is driven by a liquid crystal driver circuit (not shown) using a voltage corresponding to the image information.

The information device 10 can extract minutiae points of a fingerprint image and detect movement or the like of the fingerprint image based on the minutiae points to reduce the processing load to the comparison section 30. Therefore, the information device 10 may include the minutiae point extraction section 60. The minutiae point extraction section 60 is capable of detecting a ridge (peak or projecting section) of a fingerprint image and determining ridge bifurcations and ridge endings.

Figure 2A:
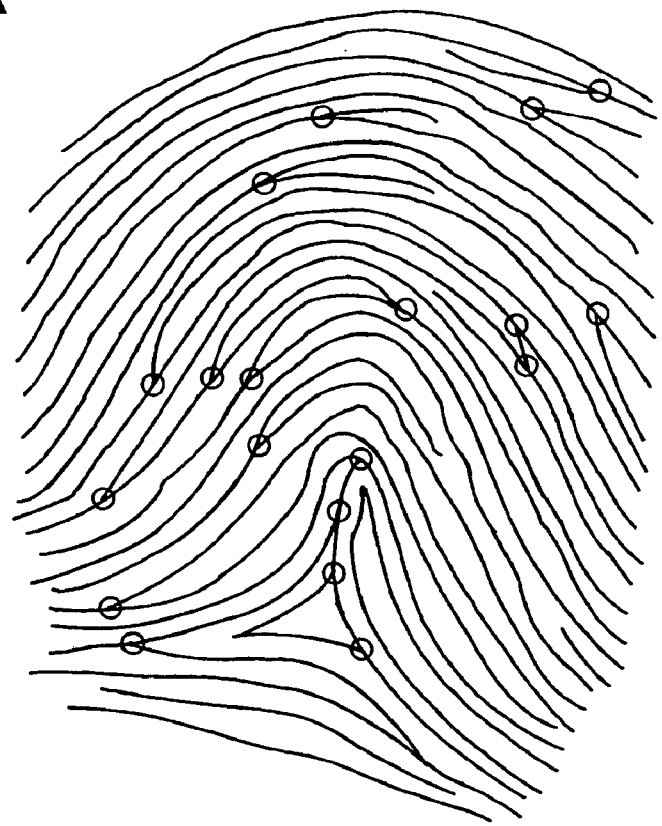
FIG. 2A is a diagram for illustrating a ridge bifurcation which is one of minutiae points of a fingerprint.
Figure 2B:
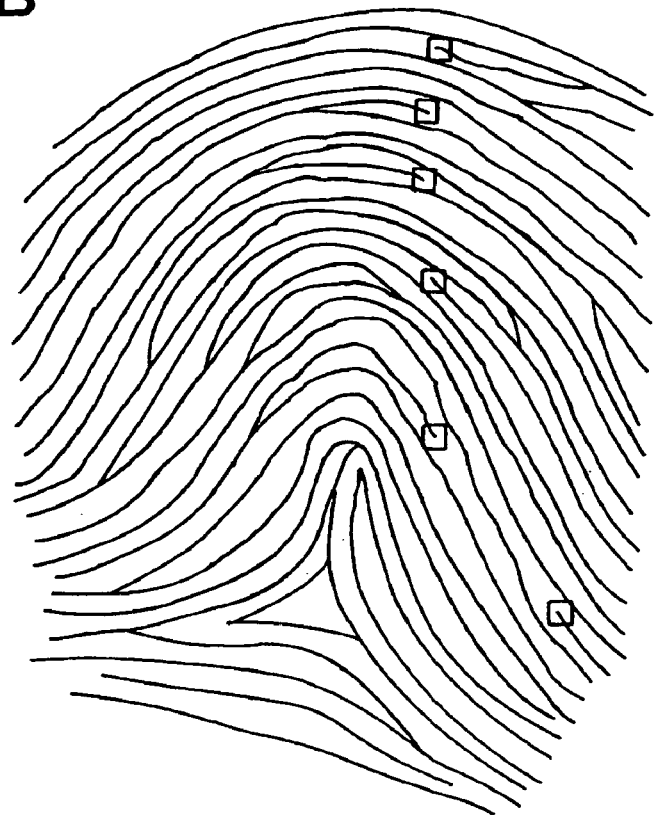
FIG. 2B is a diagram for illustrating a ridge ending which is also one of minutiae points of a fingerprint.

FIGS. 2A and 2B show minutiae points of a fingerprint.

FIG. 2A shows ridge bifurcations of a fingerprint; and FIG. 2B shows ridge endings of a fingerprint. Ridge bifurcations of a fingerprint are extracted by the minutiae point extraction section 60 from a fingerprint image captured by the fingerprint image capture section 20, for example. In FIGS. 2A and 2B, the fingerprint image shows the ridges (projecting sections) of a fingerprint. A ridge bifurcation is a portion at which a ridge divides into two or more branches. A ridge ending is a portion at which a ridge ends.

Since a fingerprint is unique, distribution of ridge bifurcations or ridge endings differs between individuals. Therefore, if ridge bifurcations or ridge endings can be determined, it suffices to merely compare the distribution of ridge bifurcations or ridge endings. This reduces the amount of information to be compared, whereby the load of comparison processing can be reduced.

In FIG. 1, the comparative section 30 compares the distribution of minutiae points including ridge bifurcations and ridge endings of the first and second fingerprint images, and calculates the moving distance, moving direction, moving velocity, and rotational angle from the positional deviation of the corresponding minutiae points. The image generation section 40 generates an image by scrolling an image to be displayed or moving a pointer corresponding to the moving distance, moving direction, moving velocity, and rotational angle calculated by the comparison section 30. The display section 50 displays the image generated by the image generation section 40 corresponding to the comparison results of the comparison section 30.

Figure 3A:
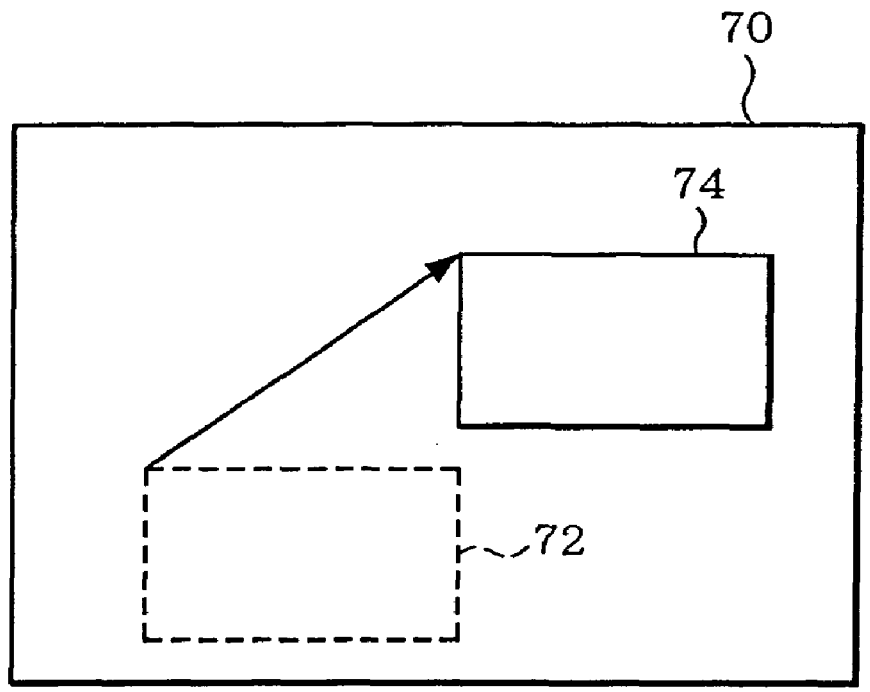
FIG. 3A is a schematic diagram showing scrolling of an image.
Figure 3B:
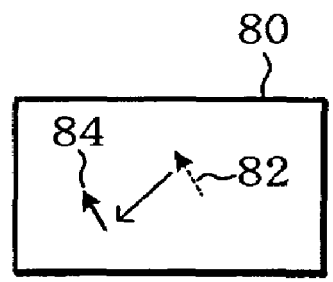
FIG. 3B is a schematic diagram showing movement of a pointer.

FIGS. 3A and 3B show examples of display control.

FIG. 3A schematically shows scrolling of an image. In the case where display information 70 is displayed in a display region 72 in the display section 50, the display region is moved to a display region 74 corresponding to the movement of the corresponding minutiae points of two fingerprint images and the display information 70 is displayed in the display region 74.

FIG. 3B schematically shows the movement of the pointer. A pointer 82 displayed in a display region 80 of the display section 50 is moved corresponding to the movement of the corresponding minutiae points of two fingerprint images, and a pointer 84 is displayed.

In the information device 10 including the fingerprint image capture section 20 and the display section 50, minutiae points of fingerprint images captured at least twice by the fingerprint image capture section 20 are extracted, and display control such as scroll control or pointer control in the display section 50 is performed corresponding to the movement of the minutiae points. Therefore, display control of the display section can be performed by using a simple configuration while preventing occurrence of malfunction and reducing the processing load. Moreover, since display control is performed corresponding to the movement of the finger, display control can be performed with high accuracy.

In the information device shown in FIG. 1, since display control is not performed if minutiae points are not associated with each other, occurrence of malfunction can be prevented. However, it is more ideal to perform the above-described display control after checking the operator by using the fingerprint image captured by the fingerprint image capture section 20. This enables the information device to be applied to an IC card such as a credit card or a cash card for which a high degree of security protection is required.

Figure 4:
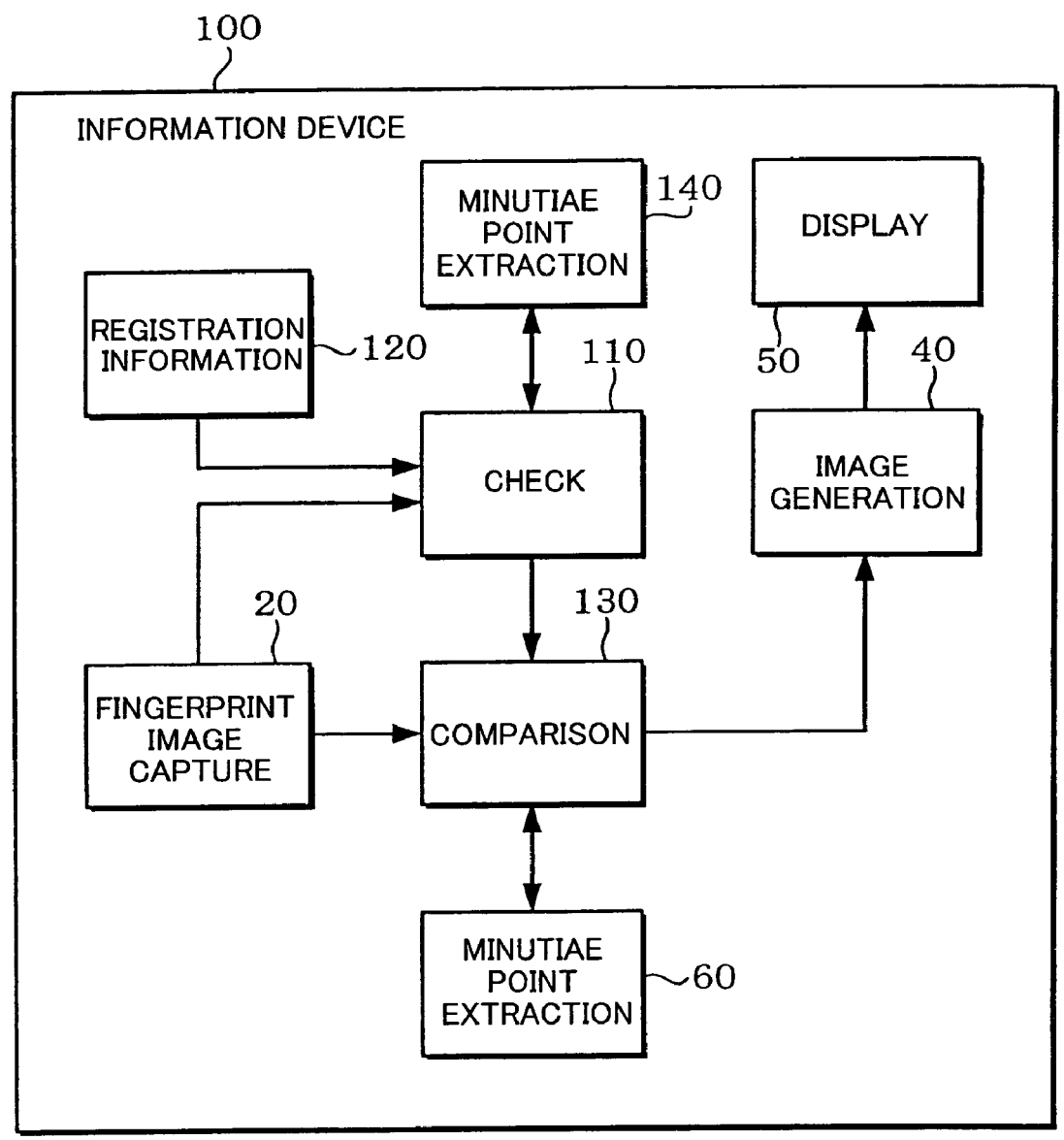
FIG. 4 is a block diagram schematically showing a configurational example of an information device which verifies an operator.

A configurational example of an information device which verifies the operator is schematically shown in FIG. 4.

In this figure, sections the same as those of the information device 10 shown in FIG. 1 are indicated by the same symbols. Description of these sections is appropriately omitted.

In an information device 100, the fingerprint image captured by the fingerprint image capture section 20 is used in a check section 110. The check section 110 checks whether or not the captured fingerprint image is the fingerprint image of the registered person by comparing the captured fingerprint image with registration information 120 registered in advance. If the check section 110 determines that the captured fingerprint image is identical with the registration information 120, the check section 110 instructs a comparison section 130 to start the comparison processing for display control.

The comparison section 130 differs from the comparison section 30 shown in FIG. 1 in that the comparison section 130 performs the comparison processing on condition that the fingerprint image is checked by the check section 110. The comparison processing of the comparison section 130 is the same as the comparison processing of the comparison section 30.

The check section 110 may use minutiae points of a fingerprint image in order to reduce the processing load. So the information device 100 may include a minutiae point extraction section 140. The minutiae point extraction section 140 extracts ridge bifurcations and ridge endings of a fingerprint image in the same manner as the minutiae point extraction section 60. Information on minutiae points is registered in advance in the registration information 120. Whether or not a captured fingerprint image is identical with the fingerprint image of a registered person is determined from the minutiae points with less processing load. Though the minutiae point extraction sections 60 and 140 are separated in FIG. 4, they may be disposed in a single block.

Figure 5:
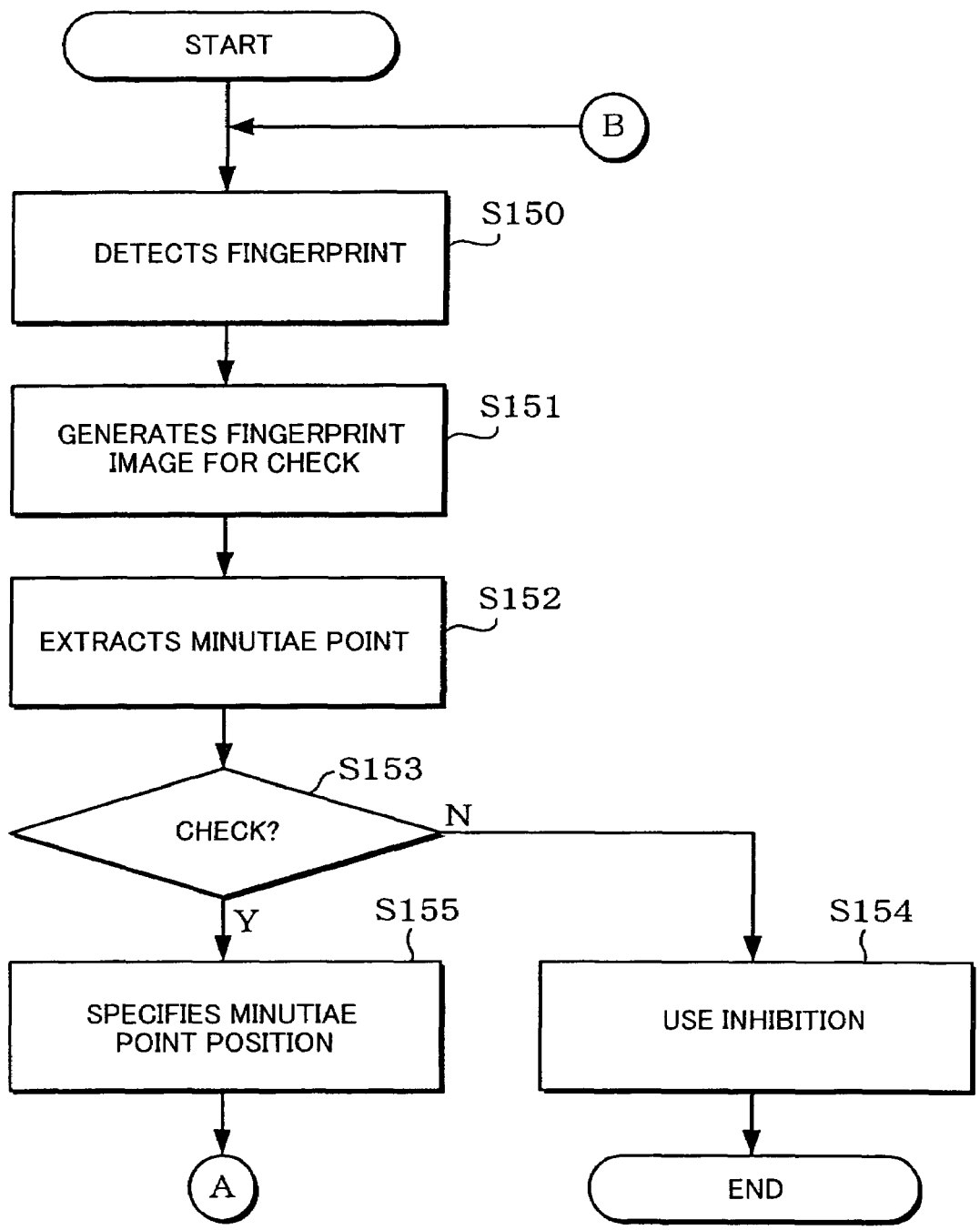
FIG. 5 is a flowchart showing the first half of an operation flow of the information device of FIG. 4.
Figure 6:
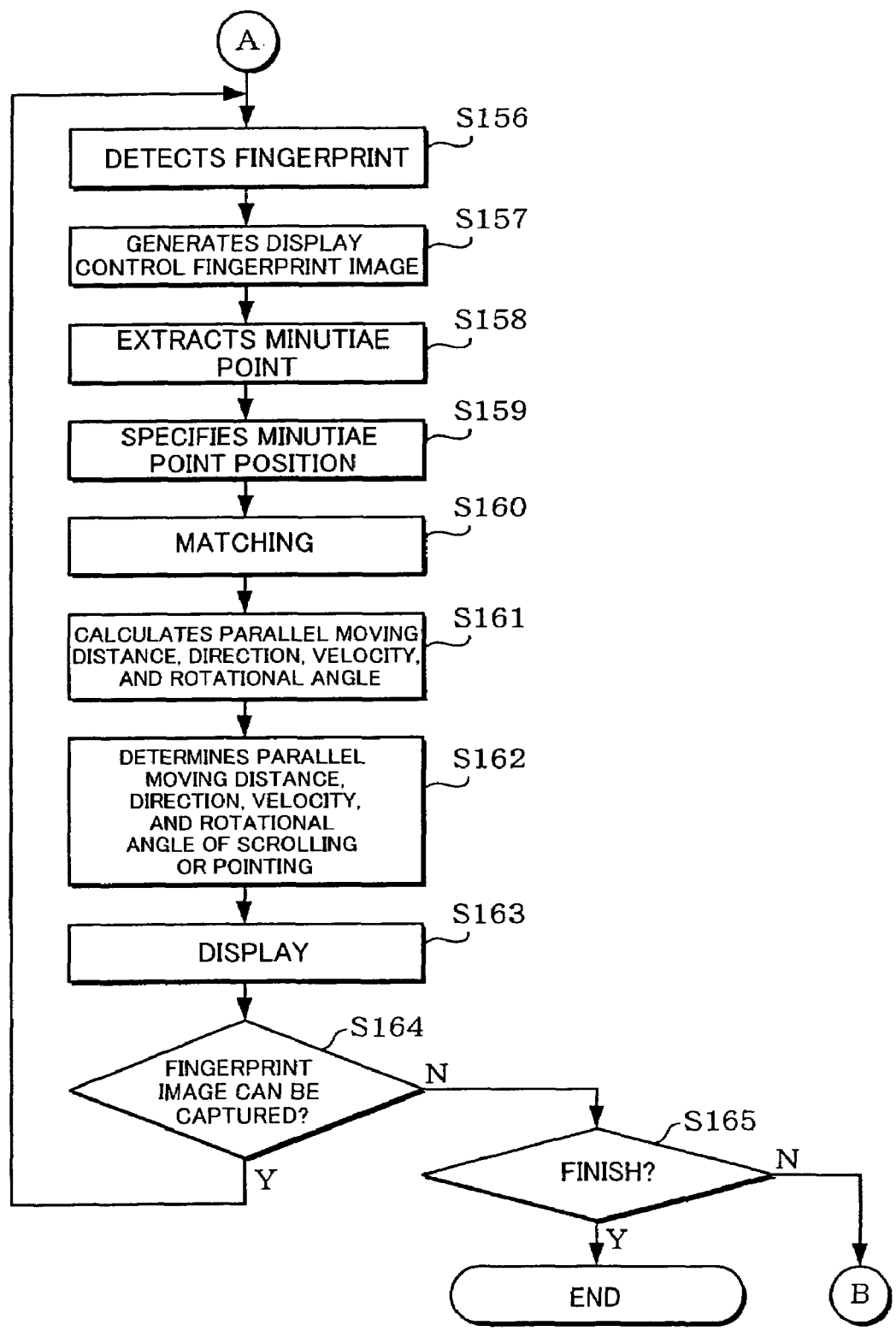
FIG. 6 is a flowchart showing the latter half of the operation flow of the information device.

FIGS. 5 and 6 show an example of an operation flow of the information device 100.

A fingerprint is detected by the fingerprint image capture section 20 (step S150), whereby a fingerprint image is captured. As a result, a fingerprint image for check (first fingerprint image) is generated (step S151). The fingerprint image for check is used in the check section 110.

The check section 110 compares the minutiae point of the fingerprint image for check extracted by the minutiae point extraction section 140 with the minutiae point of the fingerprint image registered in the registration information 120 to verify the fingerprint images (steps S152 and S153).

If it is determined that the fingerprint image for check is not identical with the registration information 120 (step S153: N), use inhibition processing is performed (step S154), and processing is terminated (END). As the use inhibition processing, indication to the effect that the fingerprint image cannot be verified may be displayed in the display section 50, or the information device may be caused to transition to a power off state, for example.

If it is determined that the fingerprint image for check is identical with the registration information 120 in the step S153 (step S153: Y), the position of the minutiae point of the fingerprint image for check used for check is specified (step S155). The position of the minutiae point is the coordinates (absolute value) of the minutiae point extracted by the minutiae point extraction section 140. The coordinates of the minutiae point may be the position in the coordinate space specified for the fingerprint image capture section 20 to capture the fingerprint image (position on the detection surface of the fingerprint sensor, for example).

A fingerprint is then detected by the fingerprint image capture section 20 (step S156), whereby a fingerprint image is captured. As a result, a display control fingerprint image (second fingerprint image) is generated (step S157). The display control fingerprint image is used in the comparison section 130.

The minutiae point extraction section 60 extracts the minutiae point of the display control fingerprint image (step S158), and specifies the position of the minutiae point of the display control fingerprint image (step S159). The comparison section 130 compares the position of the minutiae point of the fingerprint image for check (first fingerprint image) with the position of the minutiae point of the display control fingerprint image (second fingerprint image) (step S160). In more detail, the comparison section 130 calculates the deviation of the coordinates of the minutiae point of the display control fingerprint image with respect to the coordinates of the minutiae point of the fingerprint image for check as the moving distance, moving direction, moving velocity, and rotational angle (step S161). Therefore, if the minutiae point of the display control fingerprint image corresponding to the minutiae point of the fingerprint image for check cannot be found, display control cannot be performed. Therefore, unintentional malfunction by the registered person or an operation performed by a person other than the registered person can be prevented.

The scroll distance, scroll direction, scroll velocity, and scroll rotational angle or the moving distance, moving direction, moving velocity, and rotational angle of the pointer are then determined based on the moving distance, moving direction, moving velocity, and rotational angle calculated in the step S161 (step S162), and the image is displayed in the display section 50 (step S163).

Whether or not a fingerprint image can be captured is determined (step S164). If it is determined that a fingerprint image can be captured (step S164: Y), the operation is returned to the step S156, and the fingerprint image capture section 20 captures a fingerprint image as the display control fingerprint image. Display control of the display section 50 can be performed in the same manner as described above by detecting the deviation of the position of the minutiae point of the display control fingerprint image captured at this time with respect to the position of the minutiae point of the display control fingerprint image captured last time.

If it is determined that a fingerprint image cannot be captured in the step S164 (step S164: N), if the operation is finished (step S165: Y), processing is terminated (END). If the operation is not finished (step S165: N), the operation is returned to the step S150 and the fingerprint image capture section 20 captures the fingerprint image for check.

The information device 100 checks the fingerprint by using the captured fingerprint image. After the fingerprint is checked, display control is performed corresponding to the deviation of the fingerprint image captured again with respect to the checked fingerprint image. In this case, check and detection of the deviation are performed by using minutiae points of the fingerprint images. This enables display control of the display section to be performed while preventing occurrence of malfunction and maintaining security protection.

The information device 100 shown in FIG. 4 is described below in more detail.

2. Detailed Description of Information Device

Figure 7:
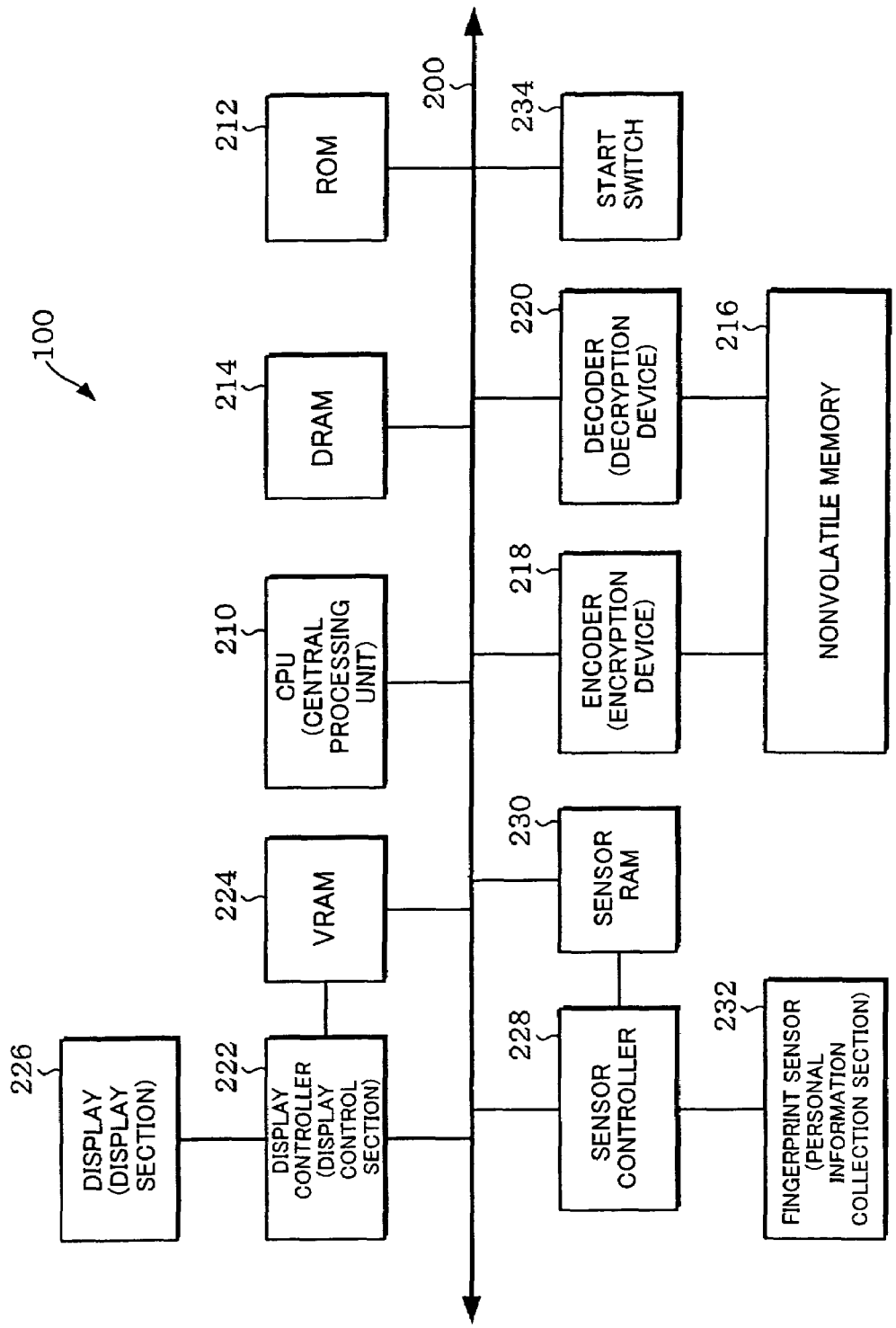
FIG. 7 is a block diagram showing a detailed configurational example of the information device of FIG. 4.

FIG. 7 is a block diagram showing a detailed configurational example of the information device 100.

Each section of the information device 100 is controlled by a central processing unit (hereinafter abbreviated as CPU) 210 connected with a bus 200 according to a program stored in a read only memory (hereinafter abbreviated as ROM) connected with the bus 200. The CPU 210 performs various types of processing by using a dynamic random access memory (DRAM) 214 as a temporary storage device as a work area. As the temporary storage device, a static random access memory (SRAM) may also be used.

The CPU 210 reads card information stored in a nonvolatile memory 216 as a long-term storage device or writes the card information in the nonvolatile memory 216. The card information is personal information for which a high degree of security protection is necessary (balance at the bank, for example). Therefore, in the case of writing the card information in the nonvolatile memory 216, the card information is encrypted by using an encoder (encryption device) 218. In the case of reading the card information from the nonvolatile memory 216, the card information is decrypted (decoded) by using a decoder (decryption device) 220. As the nonvolatile memory 216, a flash memory or SRAM may be used.

A display controller (display control section) 222 and a VRAM 224 are connected with the bus 200. The display controller 222 displays an image in a display (display section) 226 based on image data stored in the VRAM 224.

A sensor controller (personal information collection section control section) 228 and a sensor RAM 230 are connected with the bus 200. The sensor controller 228 detects ridges and valleys of a fingerprint by a fingerprint sensor (personal information collection section or fingerprint image capture section) 232, and stores an image corresponding to the ridges and valleys in the sensor RAM as a fingerprint image.

The function of the fingerprint image capture section 20 is realized by the fingerprint sensor 232. The functions of the comparison sections 30 and 130, the image generation section 40, the check section 110, and the minutiae point extraction sections 60 and 140 are realized by the CPU 210 which executes the program stored in the ROM 212. The function of the display section 50 is realized by the display 226. The registration information 120 is stored in the ROM 212 or the nonvolatile memory 216.

The present invention is not limited to the configuration in which each element of the present invention is realized by the device shown in FIG. 7. For example, minutiae points of a fingerprint image are not necessarily extracted by software manner, and they may be extracted by hardware such as a general-purpose chip or a dedicated chip. Configuration in which the nonvolatile memory 216 can be accessed without using the encoder 218 and the decoder 220 may be employed. In this case, the nonvolatile memory 216 may be accessed while allowing the CPU 210 to encode or decode the card information.

A fingerprint sensor which is suitably used in the case where the information device 100 is applied to an IC card is described below in detail.

2.1 Fingerprint Sensor

There are various methods of detecting fingerprints by using the fingerprint sensor 232 as a fingerprint image capture section, and fingerprint detection methods are not limited insofar as a fingerprint image is captured. However, reduction of space can be realized by using conventional manufacturing technology and ridges and valleys of a fingerprint can be detected with high accuracy by using a capacitance detection type of fingerprint sensor described below as the fingerprint sensor 232.

Figure 8:
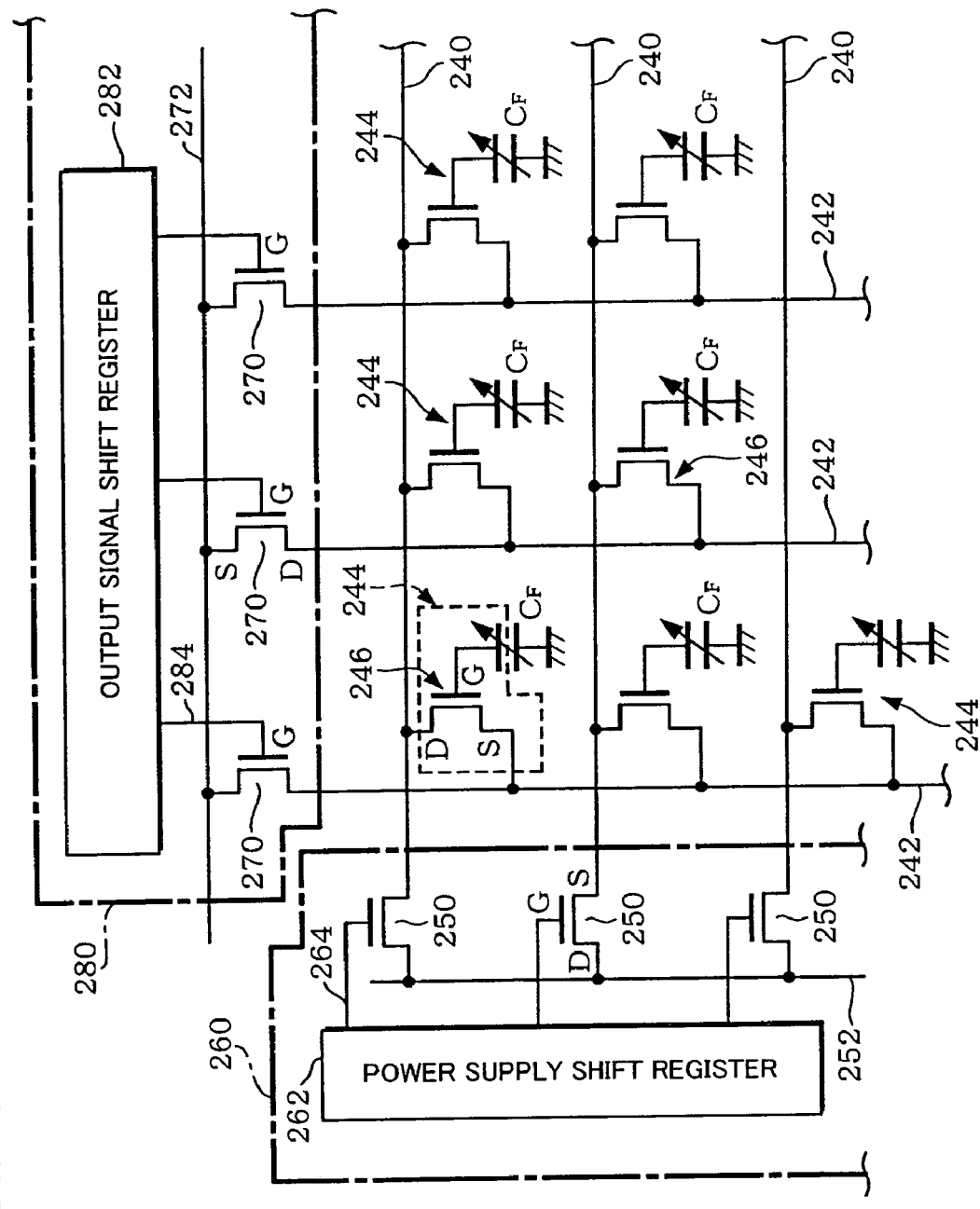
FIG. 8 is a diagram showing a configurational example of the fingerprint sensor shown in FIG. 7.

A configurational example of the fingerprint sensor 232 is shown in FIG. 8.

The fingerprint sensor 232 includes M (M is an integer of two or more) power supply lines 240, and N (N is an integer of two or more) output lines 242. A capacitance detection element 244 is provided at each intersecting point of the M power supply lines 240 and the N output lines 242. The capacitance detection element 244 is illustrated as a closed circuit when a finger is in contact with the capacitance detection element 244. The capacitance detection element 244 includes a variable capacitor $C_F$ of which the capacitance is changed depending on the ridge and valley pattern of a fingerprint, and a signal amplification element such as a signal amplification MIS thin film semiconductor device (hereinafter abbreviated as "signal amplification TFT") 246. If a finger is not in contact with the capacitance detection element 244, a grounding terminal of the variable capacitor $C_F$ is in an open state. The variable capacitor $C_F$ is described later.

The M power supply lines 240 are connected with drains D of the N signal amplification TFTs 246 arranged along the corresponding row. The M power supply lines 240 are connected with a common power supply line 252 through M power supply pass gates 250. Specifically, the power supply pass gate 250 is formed by a MIS thin film semiconductor device. A source S of the power supply pass gate 250 is connected with the power supply line 240, and a drain D of the power supply pass gate 250 is connected with the common power supply line 252. A power supply shift register 262 is provided inside a power supply select circuit 260 in addition to the M power supply pass gates 250 and the common power supply line 252. A gate G of each of the M power supply pass gates 250 is connected with a power supply select output line 264 of the power supply shift register 262.

The N output lines 242 are connected with sources S of the M signal amplification TFTs 246 arranged along the corresponding column. The N output lines 242 are connected with a common output line 272 through N output signal pass gates 270. Specifically, the output signal pass gate 270 is formed by a MIS thin film semiconductor device. A drain D of the output signal pass gate 270 is connected with the output line 242, and a source S of the output signal pass gate 270 is connected with the common output line 272. An output signal shift register 282 is provided inside an output signal select circuit 280 in addition to the N output signal pass gates 270 and the common output line 272. A gate G of the output signal pass gate 270 is connected with an output select output line 284 of the output signal shift register 282.

Figure 9:
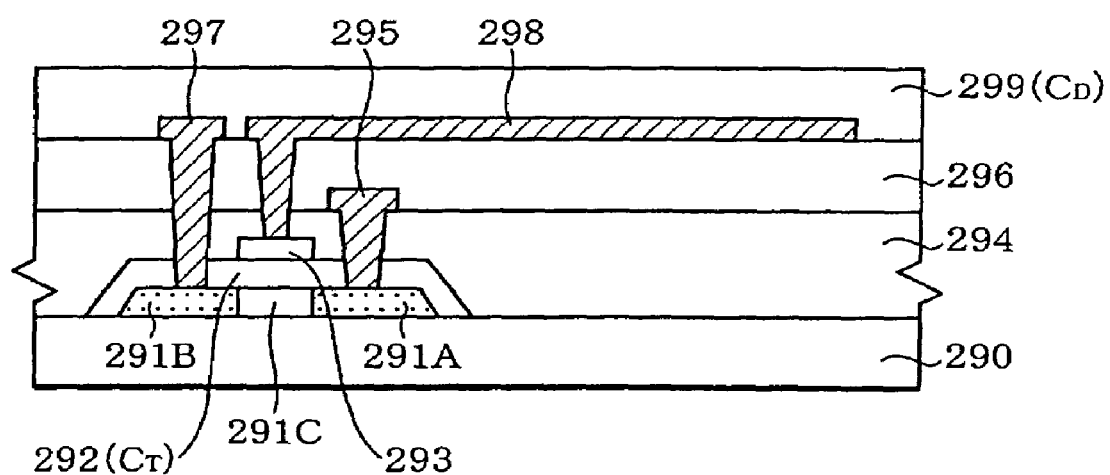
FIG. 9 is a cross-sectional view showing a capacitance detection element of the fingerprint sensor.

FIG. 9 is a cross-sectional view showing the capacitance detection element 244 of FIG. 8.

A finger not in contact with the capacitance detection element is shown in this figure.

The capacitance detection element 244 includes a signal detection element 248 in addition to the signal amplification TFT 246 which is the signal amplification element.

In FIG. 9, a semiconductor film 291 including a source region 291A, a drain region 291B, and a channel region 291C formed between the source region 291A and the drain region 291B is formed on an insulating layer 290. A gate insulating film 292 is formed on the semiconductor film 291. A gate electrode 293 is formed in a region which faces the channel region 291C with the gate insulating film 292 interposed therebetween. The semiconductor film 291, the gate insulating film 292, and the gate electrode 293 make up the signal amplification TFT 246. The power supply pass gate 250 and the output signal pass gate 270 are formed in the same manner as the signal amplification TFT 246.

The signal amplification TFT 246 is covered with a first interlayer dielectric (insulating film) 294. A first interconnect layer 295 corresponding to the output line 242 shown in FIG. 8 is formed on the first interlayer dielectric 294. The first interconnect layer 295 is connected with the source region 291A of the signal amplification TFT 246.

The first interconnect layer 295 is covered with a second interlayer dielectric 296. A second interconnect layer 297 corresponding to the power supply line 240 shown in FIG. 8 is formed on the second interlayer dielectric 296. The second interconnect layer 297 is connected with the drain region 291B of the signal amplification TFT 246. As a structure differing from the structure shown in FIG. 9, the second interconnect layer 297 may be formed on the first interlayer dielectric 294, and the first interconnect layer 295 may be formed on the second interlayer dielectric 296.

A capacitance detection electrode 298 is formed on the second interlayer dielectric 296. A capacitance detection dielectric film 299 is formed to cover the capacitance detection electrode 298. The capacitance detection dielectric film 299 is located on the outermost surface of the fingerprint sensor 232 and functions as a protective film. A finger comes in contact with the capacitance detection dielectric film 299. The signal detection element 248 is made up of the capacitance detection electrode 298 and the capacitance detection dielectric film 299.

A fingerprint is detected by the fingerprint sensor 232 by allowing a finger to come in contact with the capacitance detection dielectric film 299 shown in FIG. 9. In FIG. 8, a signal is sequentially extracted from the M×N capacitance detection elements 244 by providing a power supply voltage to one of the M power supply lines 240 and detecting a signal from one of the N output lines 242.

The fingerprint detection operation is roughly divided into (I) a case where a ridge (projecting section) of a fingerprint comes in contact with the capacitance detection dielectric film 299, and (II) a case where a valley (recess section) of a fingerprint faces the capacitance detection dielectric film 299.

Figure 10:
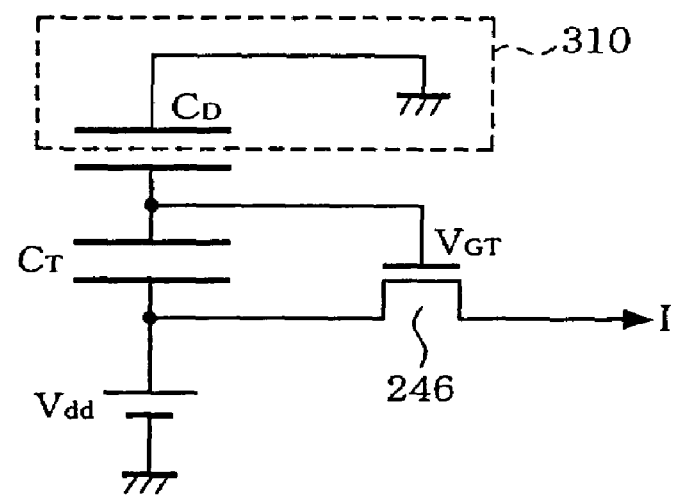
FIG. 10 is an equivalent circuit diagram of a capacitance detection element when a dielectric film of the fingerprint sensor is touched by a ridge of a fingerprint.

(I) Case where ridge (projecting section) of fingerprint pattern comes in contact with capacitance detection dielectric film 299:

FIG. 10 shows an equivalent circuit of the capacitance detection element 244 in this case.

A symbol 310 corresponds to a ridge of a human fingerprint. A grounding electrode 310 which faces the capacitance detection electrode 298 shown in FIG. 9 with the dielectric film 299 interposed therebetween is formed in a region indicated by the symbol 310. A power supply voltage Vdd is supplied from the common power supply line 252. A symbol $C_T$ indicates a transistor capacitor of the signal amplification TFT 246. A symbol $C_D$ indicates a capacitor between the detection electrode 300 and the grounding electrode (finger) 310.

The length of the gate electrode of the signal amplification TFT 246 is referred to as L (∈m), the width of the gate electrode is referred to as W (∈m), the thickness of the gate insulating film is referred to as tox (∈m), the relative dielectric constant of the gate insulating film is referred to as ∈ox, and the dielectric constant under vacuum is referred to as ∈o. The capacitance of the transistor capacitor $C_T$ is expressed as follows.

$$C_T = \epsilon_o \cdot \epsilon_{ox} \cdot L \cdot W / tox$$

The area of the capacitance detection electrode 298 is referred to as S (∈m²), the thickness of the capacitance detection dielectric film 299 is referred to as td (∈m), and the relative dielectric constant of the capacitance detection dielectric film 299 is referred to as ∈d. The capacitance of the capacitor $C_D$ is expressed as follows.

$$C_D = \epsilon_o \cdot \epsilon_d \cdot S / td$$

In the equivalent circuit shown in FIG. 10, a voltage $V_{GT}$ applied to the gate of the signal amplification TFT 246 is expressed by the following equation (1).

$$V_{GT} = Vdd / (1 + C_D/C_T) \quad (1)$$

If the capacitance of the capacitor $C_D$ is set sufficiently greater than the capacitance of the transistor capacitor $C_T$ ($C_D > 10 \times C_T$, for example), the denominator in the equation (1) becomes infinite, whereby $V_{GT}$ is approximated as shown by the following equation (2).

$$V_{GT} \approx 0 \quad (2)$$

As a result, the signal amplification TFT 246 is in an off state since almost no voltage is applied to the gate of the signal amplification TFT 246. Therefore, current I which flows between the source and the drain of the signal amplification TFT 246 becomes extremely small. The measurement point can be determined to be a ridge (projecting section) in a fingerprint pattern by measuring the current I.

Figure 11:
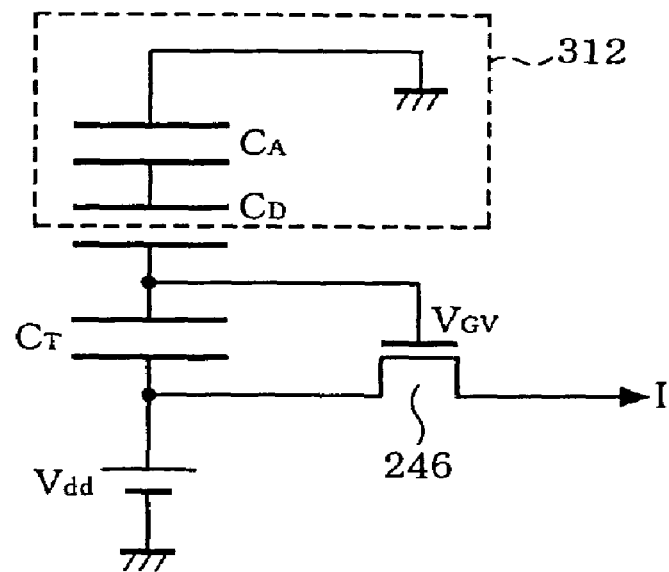
FIG. 11 is an equivalent circuit diagram of the capacitance detection element when the dielectric film of the fingerprint sensor is touched by a valley of a fingerprint.

(II) Case where valley (recess section) of fingerprint faces capacitance detection dielectric film 299:

FIG. 11 shows an equivalent circuit of the capacitance detection element 244 in this case.

A symbol 312 corresponds to a valley of a human fingerprint. In this case, a capacitor $C_A$ having air as a dielectric is formed between the dielectric film 299 and the valley in addition to the capacitor $C_D$ shown in FIG. 10.

In the equivalent circuit shown in FIG. 11, a voltage $V_{GV}$ applied to the gate of the signal amplification TFT 246 is expressed by the following equation (3).

$$V_{GV} = Vdd / \{[1 + (1/C_T)] \times 1/[(1/C_D) + (1/C_A)]\} \quad (3)$$

If the capacitance of the capacitor $C_D$ is set sufficiently greater than the capacitance of the transistor capacitor $C_T$ ($C_D > 10 \times C_T$, for example), the equation (3) is approximated as shown by the following equation (4).

$$V_{GV} \approx Vdd / [1 + (C_A/C_T)] \quad (4)$$

If the capacitance of the transistor capacitor $C_T$ is set sufficiently greater than the capacitance of the capacitor $C_A$ formed by a valley of a fingerprint ($C_T > 10 \times C_A$, for example), the equation (4) is approximated as shown by the following equation (5).

$$V_{GV} \approx Vdd \quad (5)$$

As a result, the signal amplification TFT 246 is in an on state since the power supply voltage Vdd is applied to the gate of the signal amplification TFT 246. Therefore, the current I which flows between the source and the drain of the signal amplification TFT 246 is extremely increased. Therefore, the measurement point can be determined to be a valley (recess section) of a fingerprint pattern by measuring the current I.

The variable capacitor $C_F$ shown in FIG. 8 has a capacitance equal to the capacitance of the capacitor $C_D$ when a ridge of a fingerprint is in contact with the capacitance detection dielectric film 299, and has a capacitance equal to the sum of the capacitance of the capacitor $C_D$ and the capacitance of the capacitor $C_A$ when a valley of a fingerprint faces the capacitance detection dielectric film 299. Therefore, the capacitance of the variable capacitor $C_F$ varies corresponding to a ridge or a valley of a fingerprint. A ridge or a valley of a fingerprint can be detected by detecting the current based on the change in capacitance corresponding to a ridge or a valley of a fingerprint.

Figures 12A, 12B:
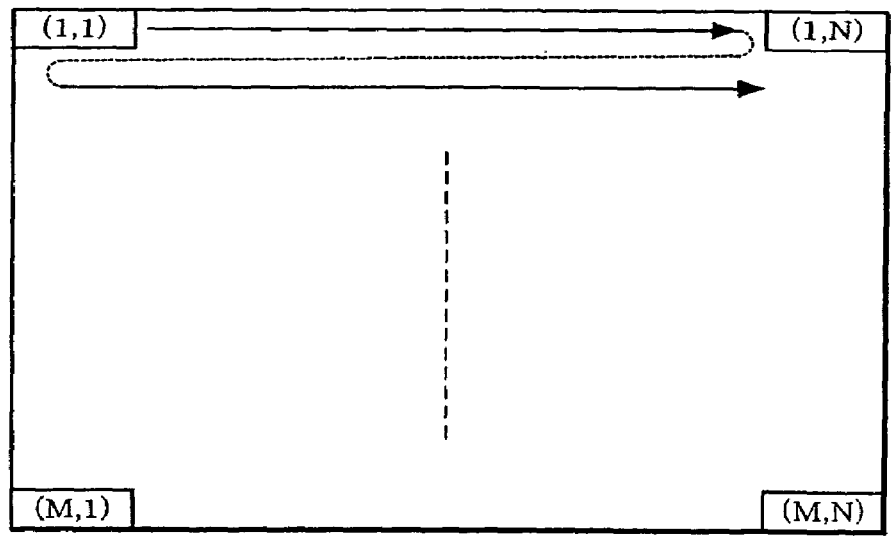
FIG. 12A is a diagram showing arrangement of the capacitance detection elements in the fingerprint sensor.
FIG. 12B is a diagram for illustrating a procedure of forming a fingerprint image from ridges and valleys detected by the capacitance detection elements.

A fingerprint pattern can be detected by performing the above-described operation in the M×N ((1, 1) to (M, N)) capacitance detection elements 244 arranged as shown in FIG. 12A by time division. In more detail, as shown in FIG. 12B, a ridge or a valley of a fingerprint in the first row is detected in the order from the capacitance detection element located at (1, 1) to the capacitance detection element located at (1, N), and a ridge or a valley of a fingerprint in the second row is detected in the order from the capacitance detection element located at (2, 1) to the capacitance detection element located at (2, N). A ridge or a valley of a fingerprint is sequentially detected in pixel units until a ridge or a valley is detected from the capacitance detection element located at (M, N). This enables the fingerprint image as shown in FIGS. 2A and 2B to be obtained, for example.

In the case where a positive power supply is used as the power supply voltage Vdd, the signal amplification TFT 246 is formed by using an enhancement n-type transistor in which a drain current does not flow at a gate voltage of about zero. Provided that the gate voltage at which the drain current is minimum (minimum gate voltage) in the transfer characteristics of the signal amplification TFT 246 is Vmin, $C_D > 10 \times C_T$ is satisfied by satisfying $0 < Vmin < 0.1 \times Vdd$.

In the case where a negative power supply is used as the power supply voltage Vdd, the signal amplification TFT 246 is formed by using an enhancement p-type transistor in which a drain current does not flow at a gate voltage of about zero. Provided that the gate voltage at which the drain current is minimum (minimum gate voltage) in the transfer characteristics of the signal amplification TFT 246 is Vmin, $C_D > 10 \times C_T$ is satisfied by satisfying $0.1 \times Vdd < Vmin < 0$.

In the information device 100, the fingerprint image can be captured by allowing the fingerprint sensor 232 having the above configuration to periodically detect the fingerprint. The fingerprint sensor 232 has the following specification, for example.

(a) Size of fingerprint sensor: 20 mm×20 mm
(b) Resolution: 386 dpi (304×304)
(c) Sampling time of fingerprint image: 36.97 ms
(d) Frame frequency: 27.05 Hz
(e) Horizontal scanning period: 121.6 μs
(f) Horizontal scanning frequency: 8.225 kHz
(g) Selection period per pixel: 400 ns

2.2 Operation

The operation of each section of the information device 100 is described below while describing the entire operation example of the information device 100 by using a flowchart.

2.2.1 Verification Processing

Figure 13:
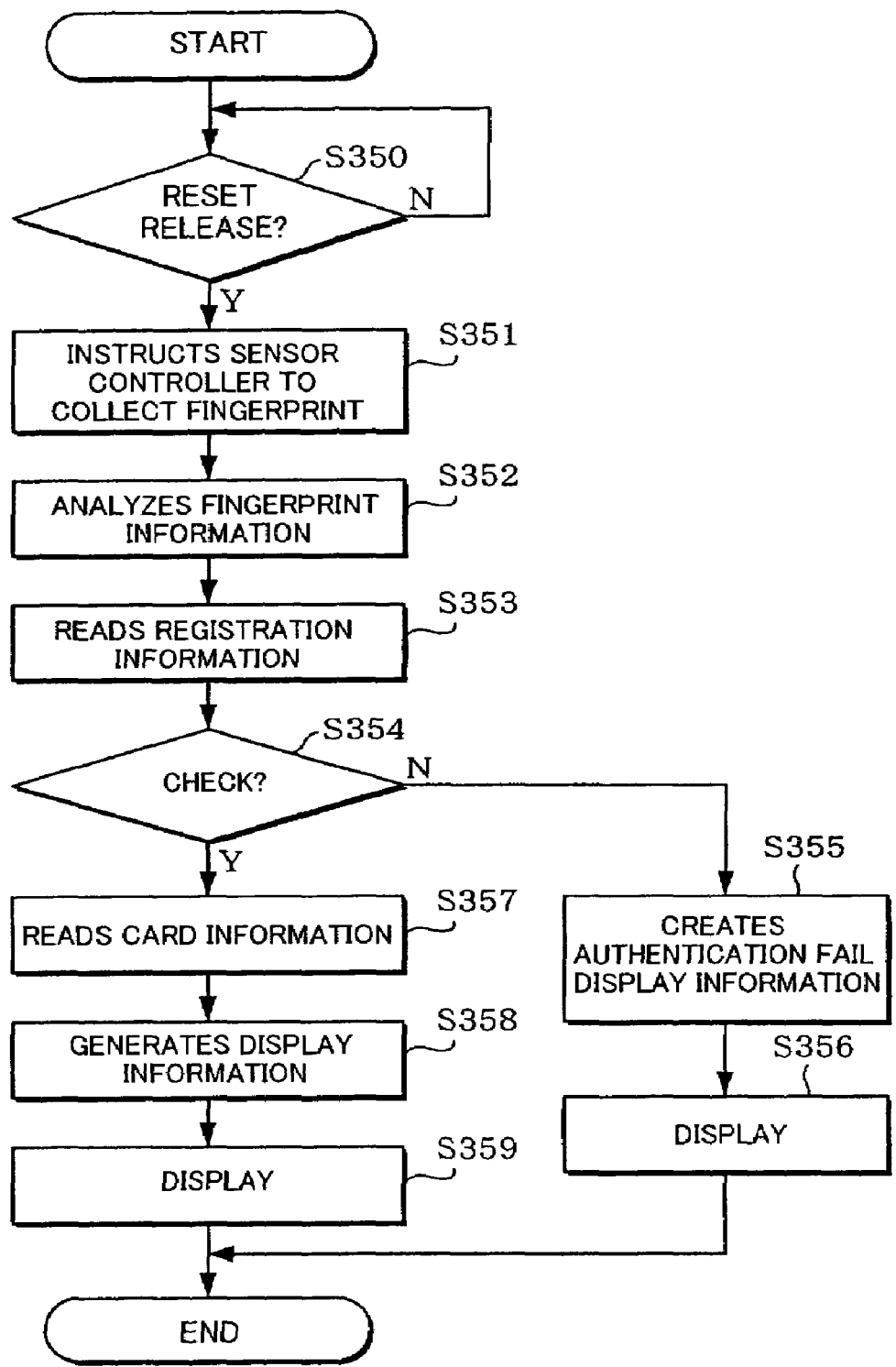
FIG. 13 is a flowchart showing an example of a verification flow of the information device.

FIG. 13 shows an example of a verification flow of the information device 100.

The CPU 210 of the information device 100 performs the following verification processing according to the program stored in the ROM 212.

When a start switch 234 of the information device 100 is turned on, a reset signal goes active, whereby each section excluding the ROM 212 and the nonvolatile memory 216 is initialized.

If the CPU 210 detects the release of the reset signal (step S350: Y), the CPU 210 instructs the sensor controller 228 to collect fingerprint information (personal information in a broad sense) (step S351). In this example, the CPU 210 instructs the sensor controller 228 to start capturing a fingerprint image. The sensor controller 228 sends a given signal to the fingerprint sensor (personal information collection section) 232, and the fingerprint sensor 232 reads the fingerprint information. As shown in FIGS. 12A and 12B, the fingerprint information read in pixel units is stored in the sensor RAM 230 so that one sheet of a fingerprint image is obtained.

The CPU 212 reads an image analysis program (routine) from the ROM 212, and analyzes the fingerprint image stored in the sensor RAM 230 (step S352). This allows minutiae points of a fingerprint image to be extracted, whereby coordinates of the minutiae points by the fingerprint sensor are determined.

As minutiae points of a fingerprint image, ridge bifurcations and ridge endings are used as shown in FIGS. 2A and 2B. Minutiae points are extracted as follows. After eliminating noise from one sheet of a fingerprint image stored in the sensor RAM 230, image processing which allows the ridge (peak or projecting section) to become a thin and clear curve is performed. In the case where the ridges which should be connected are cut, processing for complementing the ridges is performed. Ridge bifurcations and ridge endings of a fingerprint image are then extracted.

After ridge bifurcations and ridge endings are extracted, coordinates of the ridge bifurcations and the ridge endings on the electrode matrix of the fingerprint sensor 232 are specified. In the case where k (k is an integer) minutiae points are extracted in a fingerprint image captured at a time t, the coordinates of the vectors $r_{t,1}$ to $r_{t,k}$ are determined as shown by the following equation (6).

$$\vec{r}_{t,\alpha} = \begin{pmatrix} x_{t,\alpha} \\ y_{t,\alpha} \end{pmatrix} \quad (\alpha = 1, 2, \ldots, k) \tag{6}$$

$x_{t,\alpha}$ and $y_{t,\alpha}$ are coordinates specified by the XY axes on the fingerprint sensor which intersect each other at right angles.

In the case where the vector $r_{t,\beta}$ of the β-th minutiae point exists at a position of (i, j) on the fingerprint sensor matrix, $x_{t,\beta}=i$ and $y_{t,\beta}=j$ are satisfied, whereby the absolute position in the coordinate space for capturing the fingerprint image by using the fingerprint sensor 232 is expressed as shown by the following equation (7).

$$\vec{r}_{t,\beta} = \begin{pmatrix} i \\ j \end{pmatrix} \tag{7}$$

The fingerprint image analysis results including the minutiae point information such as the position (coordinates) of the extracted minutiae point are stored in the DRAM 214.

After the analysis of the captured fingerprint image is completed in the step S352 shown in FIG. 13, the CPU 210 instructs the decoder 220 to read the personal verification information (registration information in a broad sense) from the nonvolatile memory 216 (step S353). The personal verification information (fingerprint minutiae point information; registration information in a broad sense) registered in advance is stored in the nonvolatile memory 216 in an encrypted state. The decoder 220 decodes the personal verification information read from the nonvolatile memory 216 and outputs the decoded personal verification information to the CPU 210.

The CPU 210 compares the personal verification information output from the decoder 220 with the fingerprint image stored in the DRAM 214 (step S354).

If the personal verification information output from the decoder 220 does not coincide with the fingerprint image stored in the DRAM 214 in the step S354 (step S354: N), the CPU 210 creates an image indicating the result such as "Verification failed" and stores the image in the VRAM 224 (step S355).

The CPU 210 instructs the display controller 222 to display the image stored in the VRAM 224 (step S356). The display controller 222 sends a given signal to the display 226, and the display 226 displays the image stored in the VRAM 224.

If the personal verification information output from the decoder 220 coincides with the fingerprint image stored in the DRAM 214 in the step S354 (step S354: Y), the CPU 210 reads the card information (balance at the bank, for example) of the verified person from the nonvolatile memory 216 through the decoder 220 (step S357), and stores the card information in the DRAM 214. The CPU 210 may exchange information with the outside and store the information in the DRAM 214.

The CPU 210 selects the information to be displayed from the information stored in the DRAM 214, and creates an image corresponding to the selected information (step S358). The information on the created image is stored in the VRAM 224. The CPU 210 instructs the display controller 222 to display the image stored in the VRAM 224 (step S359). The display controller 222 sends a given signal to the display 226, and the display 226 displays the image stored in the VRAM 224.

2.2.2 Check Method

The information device 100 uses minutiae points of a fingerprint image when checking the fingerprint image in order to reduce the processing load. For example, check uses distribution of minutiae points obtained by repeatedly inspecting whether or not the minutiae point information (position of the minutiae point) of a fingerprint as the personal verification information read from the nonvolatile memory 216 coincides with the positions of minutiae points extracted from the captured fingerprint image while moving them.

Moreover, numerical information may be provided to each minutiae point. In this case, since it suffices to determine whether or not the numerical values coincide with each other for each minutiae point of a fingerprint, the processing load necessary for repeatedly checking fingerprint images can be further reduced.

As the numerical information added to minutiae points of a fingerprint, a numerical value calculated based on the positional relation with other minutiae points can be given. The following description illustrates the case where the connection relation between each minutiae point is converted into a numerical value and the case where the relation between line segments connecting minutiae points and ridges of a fingerprint image is converted into a numerical value.

2.2.2.1 Converting Line Segments Into Numerical Value

In this method, minutiae points are connected with the closest minutiae point and the second closest minutiae point by straight lines. This allows a plurality of line segments to be drawn from each minutiae point, whereby the lengths of the line segments and the angle formed by the line segments can be provided to each minutiae point as numerical information. Therefore, in the case where each minutiae point is compared with the registration information having numerical information on each minutiae point, since it suffices to merely compare the numerical values for each minutiae point, complicated check processing requiring strictness can be performed with less processing load.

Figure 14:
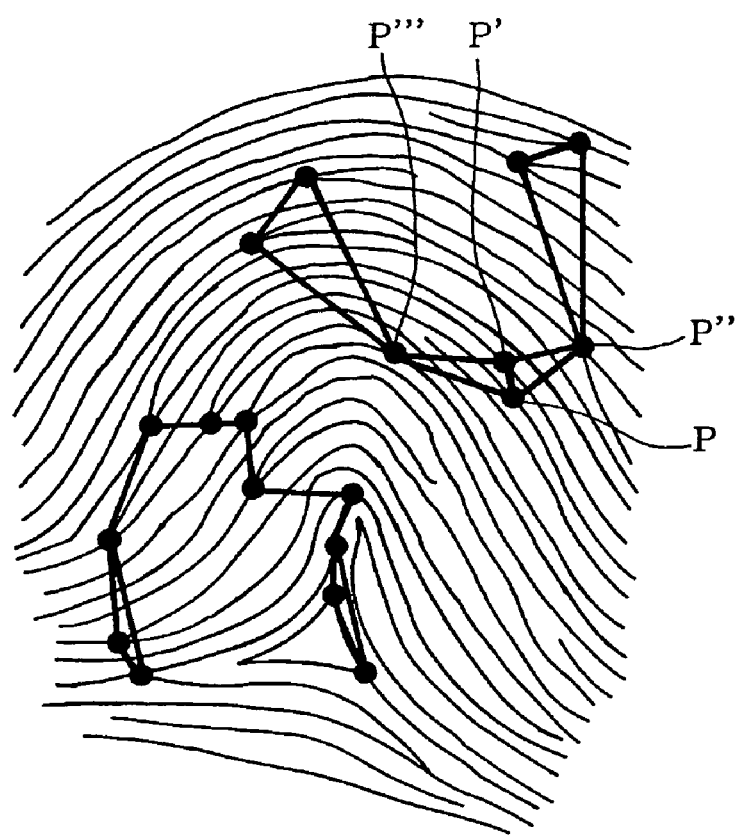
FIG. 14 is a diagram showing an example of connecting minutiae points of a fingerprint image.

FIG. 14 shows an example of connecting minutiae points of a fingerprint image.

Ridge bifurcations are used as minutiae points in this figure. A plurality of line segments are drawn from each minutiae point. Taking a minutiae point P as an example, the closest minutiae point to the minutiae point P is a minutiae point P', and the second closest minutiae point to the minutiae point P is a minutiae point P''. The closest minutiae point to a minutiae point P''' is the minutiae point P', and the second closest minutiae point to the minutiae point P''' is the minutiae point P. Therefore, the minutiae point P is associated with three line segments with the minutiae point P as the starting point, specifically, a line segment which connects the minutiae point P and the minutiae point P', a line segment which connects the minutiae point P and the minutiae point P'', and a line segment which connects the minutiae point P and the minutiae point P'''. The numerical information including the angle formed by two line segments selected from the three line segments and the length of each line segment is added to each minutiae point.

Therefore, N (N is an integer of two or more) connection lines are drawn from each minutiae point, and N pieces of line segment length information is provided to each minutiae point corresponding to the N connection lines. In addition, $_NC_2$ pieces of angle information is determined. In FIG. 15A, three connection lines are drawn with a minutiae point $P_1$ as the starting point, and three pieces of line segment length information and $_3C_2$ (=3) pieces of angle information are provided to the minutiae point $P_1$. Provided that the three line segments are referred to as $L_{12}$, $L_{13}$, and $L_{14}$ and the angle formed by the line segment $L_{1i}$ and the line segment $L_{1j}$ is referred to as $\theta_{1ij}$, ($L_{12}$, $L_{13}$, $L_{14}$, $\theta_{123}$, $\theta_{142}$, and $\theta_{143}$) is provided to the minutiae point $P_1$ as the fingerprint information used for check and comparison. The characteristic numerical values are assigned to each minutiae point in this manner (FIG. 15B).

As shown in FIG. 16, inner product values IP of two line segments may be provided as information associated with a minutiae point. The $_NC_2$ inner products IP are provided to a minutiae point from which N line segments are drawn. In FIG. 15A, three inner products $IP_{1ij}$ (=$L_{1i} \cdot L_{1j} \cdot \cos \theta_{1ij}$) are provided.

Each minutiae point and the numerical information characteristic of the minutiae point are provided in this manner. If k minutiae points exist in the fingerprint, k pieces of numerical information are obtained corresponding to the k minutiae points. In the case of checking or comparing the fingerprints, whether or not the numerical information coincides within a given error range is determined, and personal verification or finger position comparison is performed based on the rate of coincidence. As shown in FIG. 15C, in the case where the line segment length information and the angle information are provided to the minutiae point, a minutiae point $P_i$ characterized by characteristic numerical information ($L_{i1}$, $L_{i2}$, $L_{i3}$, $\theta_{i12}$, $\theta_{i13}$, and $\theta_{i23}$) is recognized in reference information (registration information at the time of check or minutiae point information in the last frame at the time of comparison), and a minutiae point $P_j$ characterized by characteristic numerical information ($L_{j1}$, $L_{j2}$, $L_{j3}$, $\theta_{j12}$, $\theta_{j13}$, and $\theta_{j23}$) is recognized in collected information (minutiae point information obtained in the current frame). If at least two pieces of line segment length information and the angle formed by these line segments in the numerical information coincide between the minutiae points $P_i$ and $P_j$, the minutiae points $P_i$ and $P_j$ can be determined to be the same minutiae point. In checking a fingerprint, at least four minutiae points should coincide with the minutiae points in the registration information. In position comparison, at least two (ideally three or more) minutiae points should coincide between the previous frame and the current frame.

Although minutiae points may be connected irrespective of ridge bifurcations and ridge endings, they may be selectively connected. Ridge bifurcations may be connected to one another and ridge endings may be connected to one another. By considering connection conditions, more strict check can be achieved.

2.2.2.2 Converting Relationship Between Ridges Into Numerical Value

In this method, minutiae points are connected by a straight line. Since the lines connecting minutiae points intersect ridges of a fingerprint image, the number of times a line associated with a minutiae point intersects the ridges may be provided as the numerical information. In this case, in the case where each minutiae point is compared with the registered information having the numerical information on each minutiae point, since it suffices to merely compare the numerical values for each line segment which connects minutiae points, the check processing which is complicated and for which strictness is required can be performed while reducing the processing load.

Figures 17A, 17B:
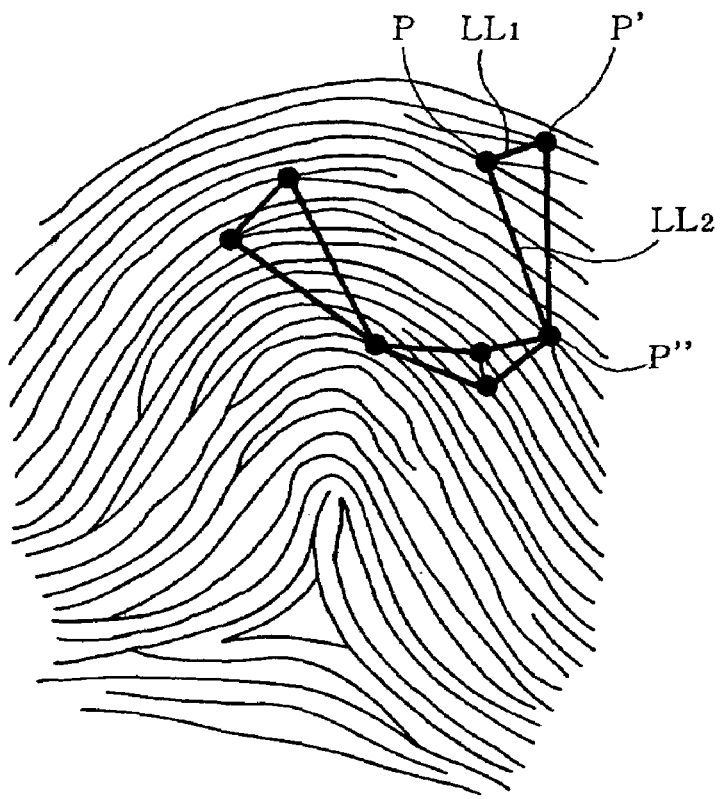
FIG. 17A is a diagram showing an example of connecting minutiae points of a fingerprint image.
FIG. 17B is a table showing examples of the ridge information.

FIG. 17A shows an example of connecting minutiae points of a fingerprint image

Line segments thus connect minutiae points. For example, the minutiae point P is connected to the minutiae points P' and P'' by line segments. The line segment $LL_1$ connecting the minutiae point P and the minutiae point P' and not intersecting any ridge of a fingerprint provides "0" as the numerical information (or ridge information) "0", and the line segment $LL_2$ connecting the minutiae point P and the minutiae point P'' and intersecting four ridges provides "4" as the numerical information.

This enables the ridge information including the number of times the line segment $LL_x$ drawn from each minutiae point to other minutiae point crosses ridges of a fingerprint to be provided to each minutiae point, as shown in FIG. 17B.

Specifically, a combination of the number of times two line segments cross ridges of a fingerprint is provided to the minutiae points P and P' as the ridge information. A combination of the number of times four line segments cross ridges of a fingerprint is provided to the minutiae point P''' as the ridge information. Since it suffices to merely compare the minutiae points by using the number of times the line segments cross ridges of a fingerprint included in the ridge information provided to each minutiae point, the check processing can be performed while reducing the processing load.

2.2.3 Display Control Processing

A specific example of display control processing performed after the verification processing shown in FIG. 13 is described below.

Figure 18:
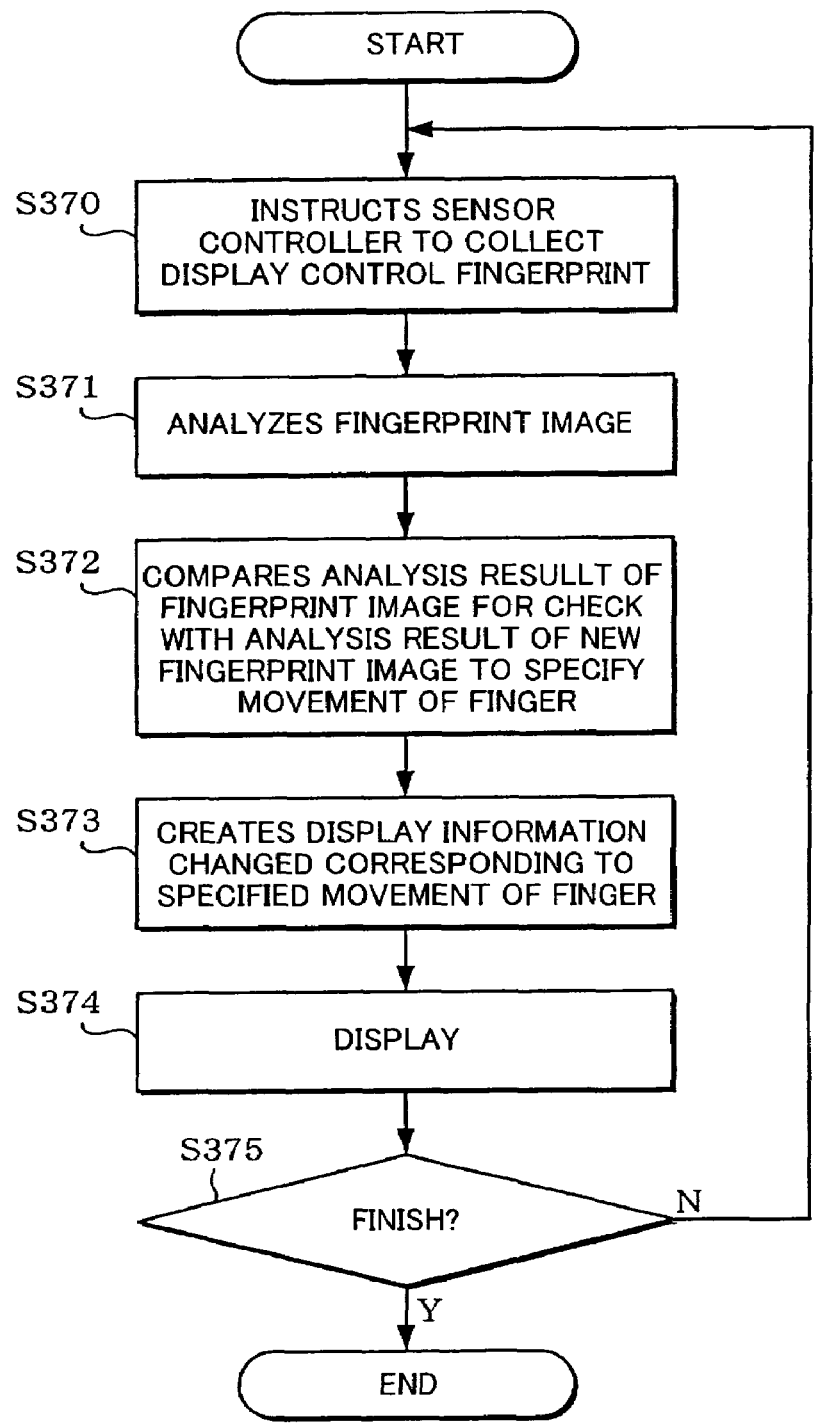
FIG. 18 is a flowchart showing an example of a display control flow of the information device.

FIG. 18 shows an example of a flow of display control processing of the information device 100.

If the captured fingerprint image is determined to be the fingerprint image of the registered person by the verification processing shown in FIG. 13, the CPU 210 of the information device 100 performs the following display control processing according to the program stored in the ROM 212.

The CPU 210 instructs the sensor controller 228 to collect the fingerprint information (step S370). In this example, the CPU 210 instructs the sensor controller 228 to start capturing a fingerprint image. The sensor controller 228 sends a given signal to the fingerprint sensor (personal information collection section) 232, and the fingerprint sensor 232 reads the fingerprint information. As shown in FIGS. 12A and 12B, the fingerprint information read in pixel units is stored in the sensor RAM 230 so that one sheet of a fingerprint image is obtained.

In the case where the fingerprint sensor 232 repeatedly captures fingerprint images at a given frame frequency, if the verification processing shown in FIG. 13 is completed in a frame cycle, a fingerprint image (frame f, for example) captured in the step S370 is a fingerprint image in a frame next to the frame (frame (f+1), for example) of a fingerprint image captured in the step S351 in FIG. 13.

The CPU 212 reads the image analysis program (routine) from the ROM 212, and analyzes the fingerprint image stored in the sensor RAM 230 (step S371). This allows minutiae points of a fingerprint image to be extracted, and coordinates of the minutiae points on the fingerprint sensor to be determined. As minutiae points of a fingerprint image, ridge bifurcations and ridge endings are used. Analysis results of a fingerprint image including the minutiae point information such as the position (coordinates) of the extracted minutiae points are stored in the DRAM 214.

The CPU 210 compares the new fingerprint image analysis results with the old fingerprint image analysis results to specify the movement of the finger on the fingerprint sensor (step S372). The new fingerprint image analysis results are analysis results for the display control fingerprint image (second fingerprint image) obtained in the step S371. The old fingerprint image analysis results are analysis results for the fingerprint image for check (first fingerprint image) obtained in the step S351 in the verification processing shown in FIG. 13.

In more detail, k minutiae points are obtained from the fingerprint image for check captured at a time t1 and expressed by the following equation (8).

$$\vec{r}_{t1,\alpha} = \begin{pmatrix} x_{t1,\alpha} \\ y_{t1,\alpha} \end{pmatrix} (\alpha = 1, 2, \ldots, k) \tag{8}$$

m (m is an integer) minutiae points are obtained from the display control fingerprint image captured at a time t2 and expressed by the following equation (9).

$$\vec{r}_{t2,\beta} = \begin{pmatrix} x_{t2,\beta} \\ y_{t2,\beta} \end{pmatrix} (\beta = 1, 2, \ldots, m) \tag{9}$$

A parallel translation vector d and rotational transformation S are applied to the vector $r_{t1,\alpha}$ to obtain a vector $r'_{t1,\alpha}$ as shown by the following equation (10).

$$\vec{r}_{t1,\alpha}' = S(\vec{r}_{t1,\alpha} + \vec{d}) \tag{10}$$

The parallel translation vector d is expressed by the following equation (11).

$$\vec{d} = \begin{pmatrix} x_d \\ y_d \end{pmatrix} \tag{11}$$

The rotational transformation S is expressed by the following equation (12).

$$S = \begin{pmatrix} \cos\theta & -\sin\theta \\ \sin\theta & \cos\theta \end{pmatrix} \tag{12}$$

The resulting vector $r'_{t1,\alpha}$ (equation (10)) and vector $r_{t2,\beta}$ (equation (9)) are compared, and the transformation operation is repeated while changing the values for $x_d$, $y_d$, and $\theta$ until the vectors coincide at least at three points, for example. In the case where the vector $r'_{t1,\alpha}$ and the vector $r_{t2,\beta}$ do not coincide even if the transformation operation is repeated a predetermined number of times, it is determined that the fingerprint image is not the fingerprint image of a person to be verified.

Both the check processing in the step S354 shown in FIG. 13 and the comparison processing in the step S372 shown in FIG. 18 are performed by using minutiae points of fingerprint images. The check processing compares the registration information with a fingerprint image for check. The comparison processing compares the fingerprint image for check with the display control fingerprint image. Since the check processing determines whether or not a fingerprint image is the fingerprint image of a registered person, it is preferable to perform the check processing more strictly than the comparison processing. Therefore, it is preferable to perform the check processing by making conditions that at least four minutiae points coincide with the registered minutiae points, by checking the fingerprint image with the registration information using the fingerprint images captured in a plurality of frames, or by frequently checking the fingerprint images (in each frame or at an interval of several frames, for example). Since the comparison processing merely compares the fingerprint image in the last frame with the fingerprint image in the current frame, it is possible to calculate the moving distance, moving direction, moving velocity, and rotational angle when at least two minutiae points coincide.

Figure 19:
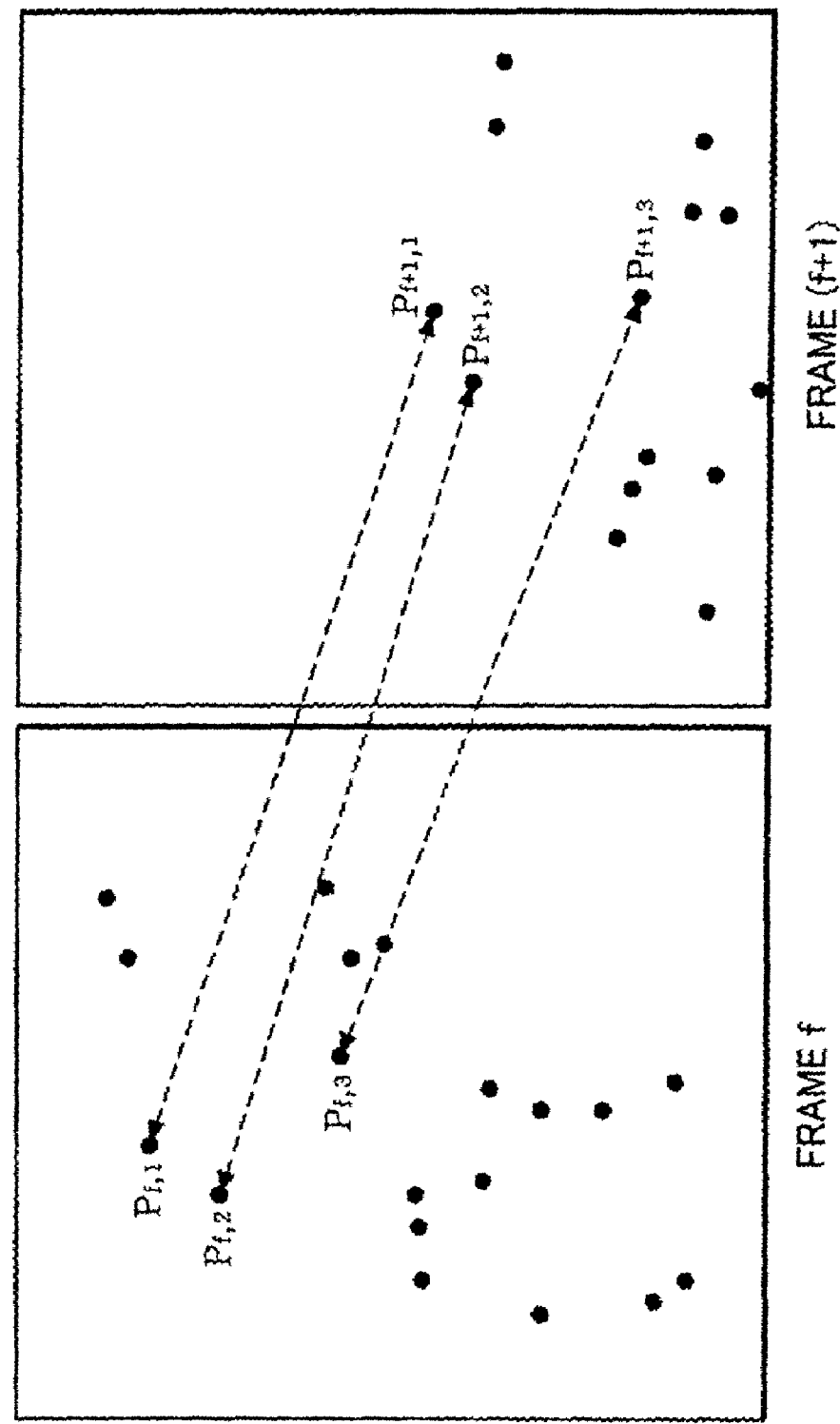
FIG. 19 shows fingerprint images in a frame f and in the next frame (f+1).

FIG. 19 shows fingerprint images in a frame f and in the next frame (f+1).

In this figure, the minutiae points of each fingerprint image are shown by using black points. If the minutiae points $P_{f,1}$ to $P_{f,3}$ in the frame f are associated with the minutiae points $P_{f+1,1}$ to $P_{f+1,3}$ in the frame (f+1) by repeating the above transformation operation, the parallel translation vector d and the rotational transformation S can be calculated. Specifically, the moving distance, moving direction, rotational angle, and moving velocity can be specified.

If the movement of the finger can be specified in the step S372 shown in FIG. 18, the CPU 210 creates a new image corresponding to the movement of the finger from the information stored in the DRAM 214 (step S373), and stores the new image information in the VRAM 224. Specifically, since the parallel translation vector d and the rotational transformation S are specified in the step S372, an image in which the display region in the display space is moved in proportion to the parallel moving distance |d| on the fingerprint sensor 232, or an image in which the display space is moved in a state in which the display region is fixed can be generated. The rotational transformation S is applied to the display space in the same manner as described above.

The CPU 210 instructs the display controller 222 to display the image stored in the VRAM 224 (step S374). The display controller 222 sends a given signal to the display 226, and the display 226 displays the image stored in the VRAM 224.

If the processing is finished (step S375: Y), processing is terminated (END). If the processing is not finished (step S375: N), the operation is returned to the step S370.

In the case where it is necessary to store new information (new balance at the bank, for example) for a long period of time by using the card, the CPU 210 sends the new information to the encoder 218. The encoder 218 encrypts the new information and stores the encrypted information in the nonvolatile memory 216.

Figure 20:
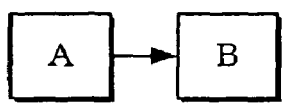
FIG. 20 shows an example of a display space and a display region.

FIG. 20 shows an example of a display space and a display region.

As shown in FIG. 20, in the case where an arbitrary region of a display space 400 can be set as the display region of the display 226, display control in which a display region 410 is moved on the display space 400 or the display space 400 is moved in a state in which the display region 410 is fixed can be performed.

Figure 21:
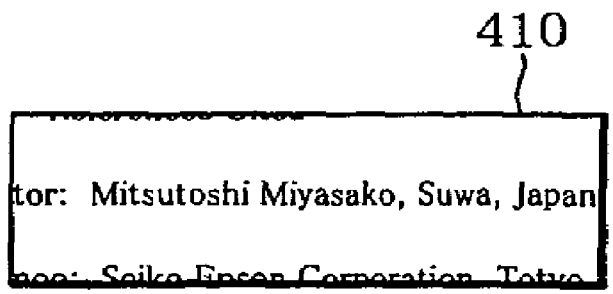
FIG. 21 shows an example of a display region before scrolling.
Figure 22:
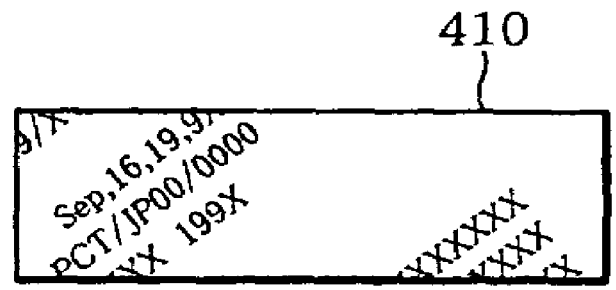
FIG. 22 shows an example of a display region after scrolling.

The display region 410 in the frame f is set at a position shown in FIG. 21. FIG. 22 shows an image obtained by using the parallel translation vector d and the rotational transformation S calculated by comparing minutiae points of a fingerprint image extracted in the frame f with minutiae points of a fingerprint image extracted in the next frame (f+1).

This is an image obtained when a finger is moved downward and rotated clockwise on the fingerprint sensor 232, and the display region 410 is moved downward and rotated clockwise with respect to the fixed display space 400 (forward direction). Alternatively, this is an image obtained when a finger is moved upward and rotated counterclockwise on the fingerprint sensor, and the display space 400 is moved upward and rotated counterclockwise with respect to the fixed display region 410 so that the display space 400 is pulled by the finger in a state in which the display region is fixed (backward direction).

2.2.4 Calculation Examples

The image information which is changed corresponding to the movement of the finger on the fingerprint sensor in the step S373 shown in FIG. 18 is generated by performing the following operation for the display space in the frame f, for example.

In the following description, the frame frequency of the fingerprint sensor 232 is referred to as $f_{FP}$ (Hz) and the frame frequency of the display 226 is referred to as $f_{DIS}$ (Hz).

The parallel translation vector d and the rotational transformation $S(\theta)$ between the fingerprint image captured in the frame at the time t1 and the fingerprint image captured in the next frame $(t2=t1+1/f_{FP})$ are calculated as follows.

The parallel translation velocity vector v is expressed by the following equation (13).

$$\vec{v} = f_{FP} \cdot \vec{d} \qquad (13)$$

The rotational velocity ν is expressed by the following equation (14).

$$\nu = f_{FP} \cdot \theta \qquad (14)$$

The scroll amount of the display region on the display space or the moving amount of the pointer is determined provided that the scroll movement coefficient is $k_{sd}$ (when $k_{sd}=1$, the movement of the finger is the same as the scroll velocity or the movement of the finger is the same as the moving velocity of the pointer), and the rotational velocity coefficient is $k_{sr}$ (when $k_{sr}=1$, the rotational velocity of the finger coincides with the scroll rotational angle or the rotational velocity of the finger coincides with the rotational velocity of the pointer).

The parallel translation vector $d_{dis}$ between the frame f and the next frame (f+1) is calculated as shown by the following equation (15).

$$\vec{d}_{dis} = \frac{k_{sd}\vec{v}}{f_{DIS}} = k_{sd} \cdot \frac{f_{FP}}{f_{DIS}} \vec{d} \qquad (15)$$

The rotational angle $\theta_{dis}$ is calculated as shown by the following equation (16).

$$\vec{\theta}_{dis} = \frac{k_{sr}\nu}{f_{DIS}} = k_{sr} \cdot \frac{f_{FP}}{f_{DIS}} \theta \qquad (16)$$

Therefore, the rotational transformation $S_{dis}$ ($\theta_{dis}$) is calculated as shown by the following equation (17).

$$S_{dis} = \begin{pmatrix} \cos\theta_{dis} & -\sin\theta_{dis} \\ \sin\theta_{dis} & \cos\theta_{dis} \end{pmatrix} \qquad (17)$$

Therefore, the display region to be displayed in the frame (f+1) can be specified by calculating the vector $r_{dis}$ in the frame f as follows.

$$\vec{r}_{dis}' = S_{dis}(\theta_{dis})(\vec{r}_{dis} + \vec{d}_{dis}) \text{ (transformation in forward direction)} \qquad (18)$$

or $$\vec{r}_{dis}' = S_{dis}(-\theta_{dis})(\vec{r}_{dis} - \vec{d}_{dis}) \text{ (transformation in backward direction)} \qquad (19)$$

The position of the pointer after being moved can be calculated in the same manner as described above. In the case of moving the pointer, it is preferable that the pointer be moved in the forward direction with respect to the operator.

The scroll movement coefficient $k_{sd}$ and the rotational velocity coefficient $k_{sr}$ are preferably in the range of 0.5 to 2 ($0.5<k_{sd}<2$ and $0.5<k_{sr}<2$). This enables the movement of the finger to be almost in synchronization with the movement of the display screen, whereby handling (operation or control) of the information device (information equipment) becomes comfortable.

3. Frequency Switching

Since the IC card or the like to which the information device 100 is applied is a portable type, the amount of power consumption must be small. Therefore, power consumption can be reduced by making the frame frequency (capture frequency) of the fingerprint sensor variable taking the use conditions for the fingerprint sensor 232 into consideration.

Figure 23:
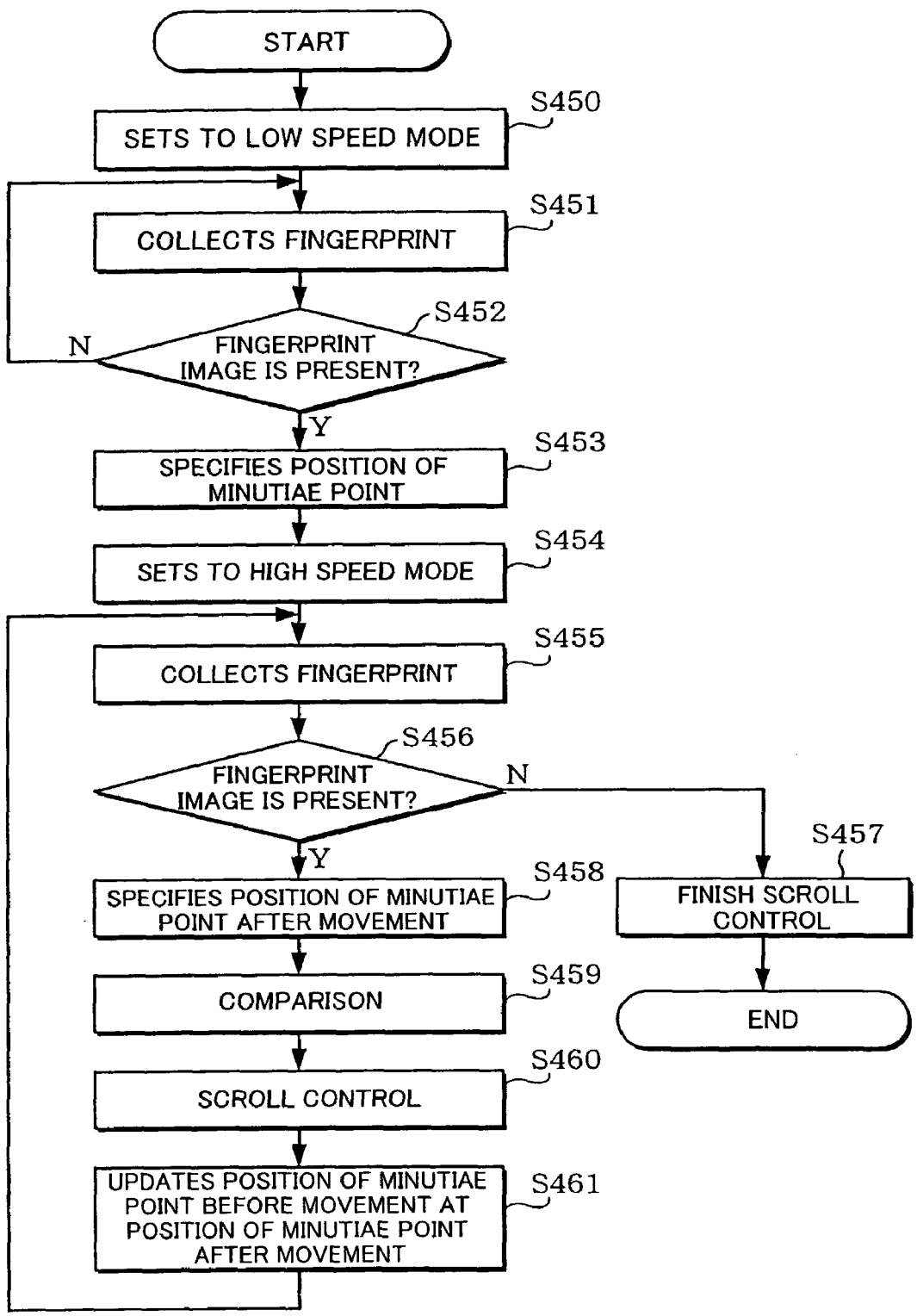
FIG. 23 is a flowchart showing an example of control processing of a frame frequency of the fingerprint sensor.

FIG. 23 shows an example of control processing of a frame frequency of the fingerprint sensor.

The following description illustrates the case where scroll control is performed after fingerprint check.

The fingerprint sensor 232 is set to a low speed mode (step S450). The low speed mode is a mode in which the fingerprint sensor captures a fingerprint image at a frame frequency of 0.3 to 3 Hz, for example. The fingerprint sensor is set to the low speed mode when the fingerprint sensor does not necessarily follow the movement of the finger. Therefore, it is preferable to reduce unnecessary power consumption by capturing the fingerprint image at low speed.

After the fingerprint is collected in the low speed mode (step S451), the presence or absence of a fingerprint image is determined (step S452).

If it is determined that no fingerprint image is captured (step S452: N), it is determined that a finger is not in contact with the fingerprint sensor. Therefore, the operation is returned to the step S451, and a fingerprint is collected.

If it is determined that a fingerprint image is captured (step S452: Y), minutiae points of the fingerprint image are extracted, and the positions of the extracted minutiae points are stored (step S453).

The fingerprint sensor 232 is then set to a high speed mode (step S454). The high speed mode is a mode in which the fingerprint sensor captures a fingerprint image at a frame frequency of 10 to 100 Hz, for example. The fingerprint sensor is set to the high speed mode when the fingerprint sensor must follow the movement of the finger, and it is necessary to capture the fingerprint image at high speed. However, it is preferable to operate the fingerprint sensor at a minimum frequency which allows the fingerprint sensor to follow the movement of the finger in order to reduce power consumption. An ideal frequency is 20 to 40 Hz.

After the fingerprint is collected in the high speed mode (step S455), the presence or absence of a fingerprint image is determined (step S456).

If it is determined that no fingerprint image is captured (step S456: N), it is determined that a finger is not in contact with the fingerprint sensor. Therefore, scroll control is terminated (step S457), and processing is finished (END).

If it is determined that a fingerprint image is captured (step S456: Y), minutiae points of the fingerprint image are extracted (step S458), and the extracted minutiae points are compared with the minutiae points of the fingerprint collected in the low speed mode and stored in the step S453 (step S459).

An image to be displayed in the display 226 is changed by performing scroll control corresponding to the moving distance, moving direction, moving velocity, and rotational angle (step S460).

The position of the minutiae point before being moved is updated at the position of the minutiae point after being moved extracted in the step S458 (step S461). The operation is returned to the step S455, and scroll control is repeated corresponding to the movement of the next fingerprint collected by the fingerprint sensor 232.

Unnecessary power consumption can be reduced by taking the use conditions for the fingerprint sensor 232 into consideration and increasing the capturing speed only in the case where the fingerprint image must be captured at high speed. The check processing is omitted in FIG. 23. It is preferable that the frame frequency when capturing at least the fingerprint image used for check (first fingerprint image) be lower than the frame frequency when capturing the fingerprint image used for display control (second fingerprint image).

In the case where the fingerprint sensor 232 periodically captures the fingerprint images, it is preferable to allow the fingerprint sensor to operate only in the case where the fingerprint image is captured.

Figure 24:
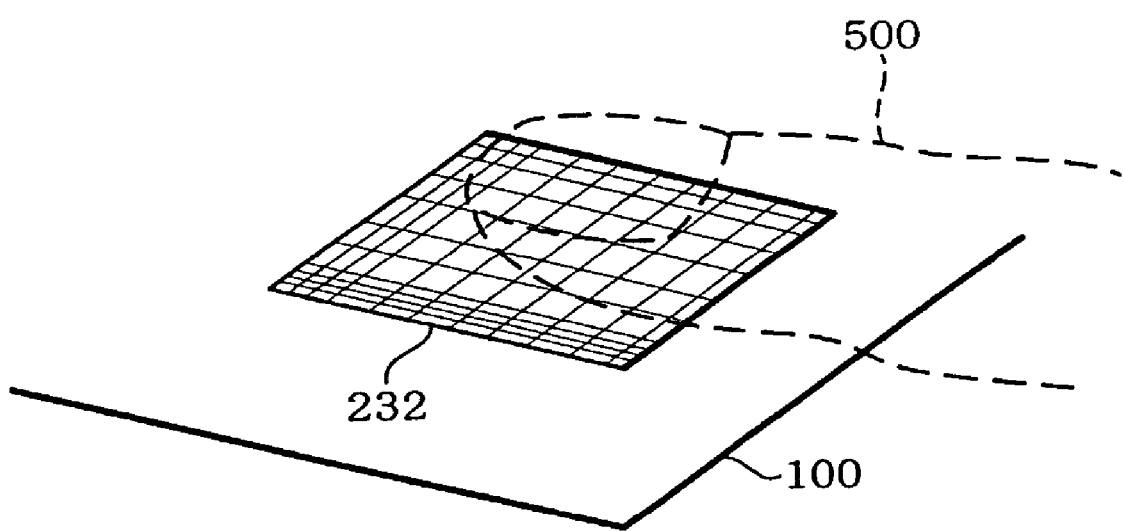
FIG. 24 is a view showing a finger of an operator to be verified by the fingerprint sensor of the information device applied to an IC card.

FIG. 24 shows a finger 500 of an operator to be verified by the fingerprint sensor 232 of the information device 100 applied to an IC card.

As shown in FIG. 9, the capacitance detection dielectric film 299 is formed on the detection surface of the fingerprint sensor 232. Therefore, if it can be detected whether or not the finger of the operator is in contact with the capacitance detection dielectric film 299, the operation of the fingerprint sensor 232 which periodically scans the fingerprint can be terminated or the operating frequency of the fingerprint sensor 232 can be decreased corresponding to the detection results.

Figure 25:
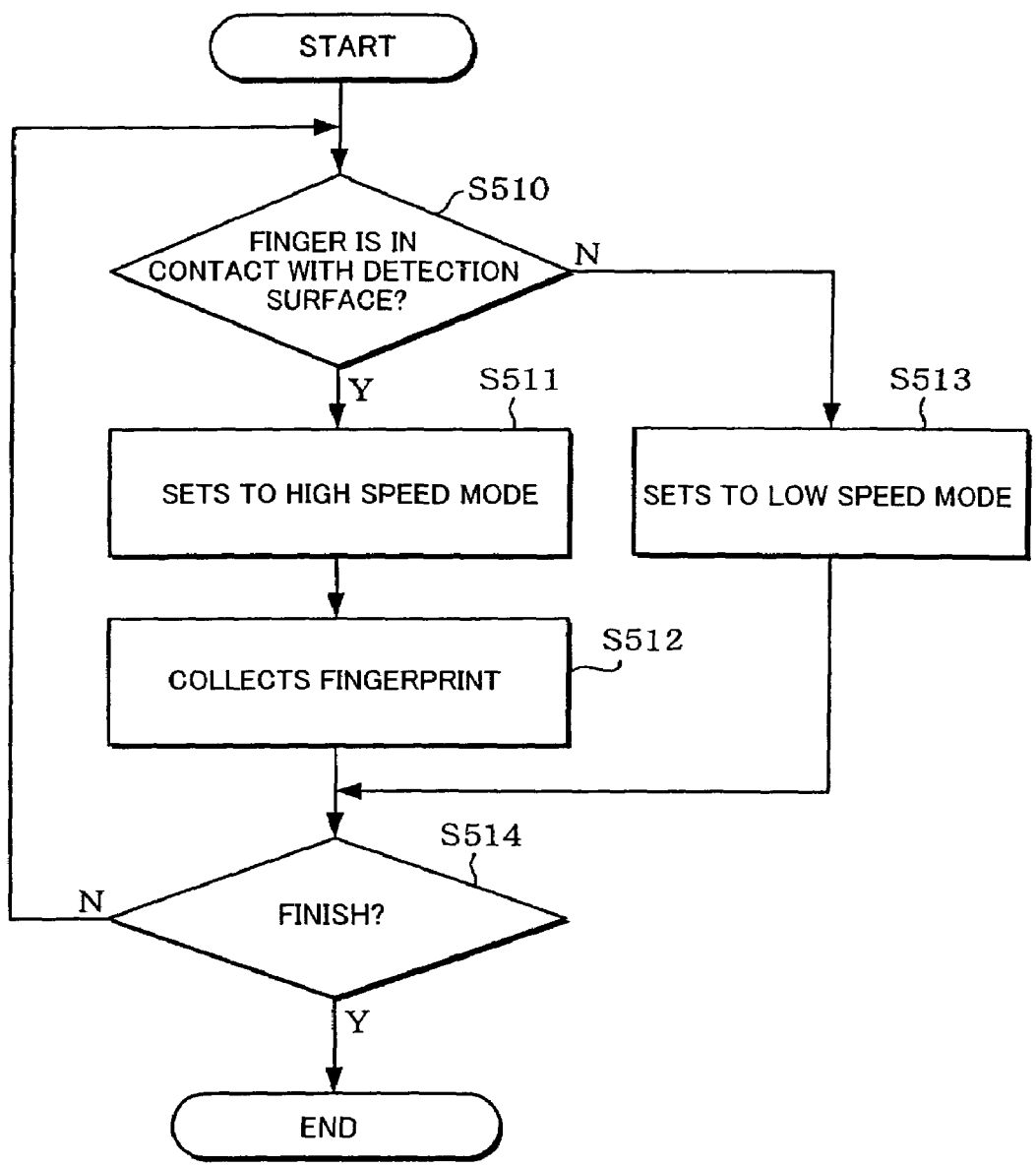
FIG. 25 is a flowchart showing an example of frequency control processing of the fingerprint sensor according to whether or not a finger of an operator is in contact with a detection surface.

FIG. 25 shows an example of frequency control processing of the fingerprint sensor according to whether or not a finger of an operator is in contact with the detection surface.

If the finger of the operator is in contact with the capacitance detection dielectric film 299 (step S510: Y), the fingerprint sensor 232 is set to the high speed mode (step S511), and a fingerprint image is captured by the fingerprint sensor 232 at a high frame frequency (step S512).

If the finger of the operator is not in contact with the capacitance detection dielectric film 299 (step S510: N), the fingerprint sensor 232 is set to the low speed mode (step S513), whereby unnecessary power consumption is prevented by decreasing the frame frequency.

After the fingerprint is collected in the high speed mode or the fingerprint sensor 232 is set to the low speed mode, if the processing is not finished (Step S514: N), the operation is returned to the step S510.

Since the fingerprint sensor is operated at a high frequency only in the case where the fingerprint image must be captured at high speed, unnecessary power consumption can be reduced. In FIG. 25, the fingerprint sensor 232 is set to the low speed mode. However, the fingerprint sensor 232 may be set to a standby mode in which only a necessary section is operated and the frequency of the fingerprint sensor is terminated.

The present invention is not limited to the above-described embodiment. Various modifications and variations are possible within the spirit and scope of the present invention.

The above-described embodiment illustrates the case where display control is performed corresponding to the movement of the finger. However, the present invention is not limited thereto. For example, the movement of the finger may be captured as the fingerprint image if the finger is moved in a specific direction (moved in the X axial direction or the Y axial direction, or rotated clockwise at 90° around the X axis or the Y axis, for example), and the function of the information device may be changed corresponding to the change of the fingerprint image (change in position of minutiae points of the fingerprint image, for example). For example, the operation mode of the information device may be changed, or a given function may be terminated, or the information device may be turned off. In the case where the information device has functions of a credit card and other cards as the IC card, the functions of each card may be switched corresponding to the movement of the finger. In the case where a recording/reproducing device has a plurality of functions, the functions such as reproducing function, fast-forwarding function, and rewinding function may be switched.

In FIG. 1 or 4, the information device may not include the image generation section 40 and the display section 50. In this case, an information device which is controlled based on the comparison results of the comparison sections 30 and 130 as the operation information can be provided.

Part of requirements of any claim of the present invention could be omitted from a dependent claim which depends on that claim. Moreover, part of requirements of any independent claim of the present invention could be made to depend on any other independent claim.

The following is disclosed relating to the above-described embodiment.

According to one embodiment of the present invention there is provided an information device comprising:

a fingerprint image capture section which captures a fingerprint image;

a comparison section which compares a first fingerprint image captured by the fingerprint image capture section with a second fingerprint image captured by the fingerprint image capture section at a given time interval after the first fingerprint image is captured;

an image generation section which generates an image based on the comparison result of the comparison section; and a display section which displays the image generated by the image generation section.

In this information device, the first fingerprint image captured by the fingerprint image capture section is compared with the second fingerprint image captured by the fingerprint image capture section at a given time interval after the first fingerprint image is captured, and an image which is changed based on the comparison result is displayed in the display section. Therefore, in the case where the first and second fingerprint images are fingerprint images of different persons, the image can be prevented from being changed. This prevents occurrence of malfunction in the case where something other than a finger is captured as the image, whereby display control of the image can be performed just as the operator intended. Moreover, leakage of information due to operation by a person whose first and second fingerprint images cannot be associated with each other can be prevented. In this information device, since it is unnecessary to separately provide a scrolling device or a pointing device, reduction of the size of the information device and an increase in the size of the display section can be achieved. In particular, in the case where the information device is applied to a highly functional card type information device such as an IC card or a smart card, reduction of space can be realized.

The information device may comprise:

a minutiae point extraction section which extracts minutiae points of the first and second fingerprint images, wherein:

the comparison section compares positions of the minutiae points of the first and second fingerprint images; and the image generation section uses a moving directions, a moving distance, and a rotational angle between corresponding two minutiae points of the first and second fingerprint images and generates an image.

In this information device, minutiae points of fingerprint images are extracted and an image is changed by using the extracted minutiae points. Therefore, the amount of information which should be compared in the comparison processing of fingerprint images is significantly decreased, whereby the processing load can be reduced. This also contributes to reduction of the size of the information device.

The information device may comprise:

a check section which checks the first fingerprint image with registration information which has been previously registered, wherein the comparison section compares the first fingerprint image with the second fingerprint image when the check section has determined that the first fingerprint image is identical with the registration information.

In this information device, the captured first fingerprint image is checked with the registration information. If it is determined that the first fingerprint image is identical with the registration information, the display image is changed by comparing the first fingerprint image with the second fingerprint image. Therefore, the information device can be applied to a credit card or a cash card for which a high degree of security protection is required. Moreover, since the fingerprint image can be checked by strictly examining the fingerprint image, it is unnecessary to strictly compare the first fingerprint image with the second fingerprint image (number of coincidence points may be about 50% of that in the check processing, for example). This enables comparison processing to be simplified even if the processing load is necessary to follow the movement of the fingerprint image in the check processing, whereby an information device capable of controlling display with high accuracy without increasing the processing load can be provided while maintaining a high degree of security protection.

In the information device, the check section may determine whether or not the first fingerprint image is identical with the registration information based on a minutiae point of the first fingerprint image.

In this information device, since minutiae points of a fingerprint image are used for check, the amount of information to be compared in the check of a fingerprint image can be significantly reduced, whereby the processing load can be reduced.

The information device may comprise:

a minutiae point extraction section which extracts a minutiae point of at least the first fingerprint image; and a check section which checks the first fingerprint image with registration information which has been previously registered, wherein:

the comparison section compares the first fingerprint image with the second fingerprint image when the check section has determined that the first fingerprint image is identical with the registration information;

the registration information includes lengths of two line segments and an angle formed by the two line segments, the line segments connecting one minutiae point of the fingerprint image with another minutiae point closest to the minutiae point, and the minutiae point and still another minutiae secondarily closest to the minutiae point; and the check section checks the first fingerprint image based on: the registration information; lengths of two line segments connecting the minutiae point of the first fingerprint image with a minutiae point closest to the minutiae point of the first fingerprint image, and the minutiae point of the first fingerprint image and another minutiae point secondarily closest to the minutiae point of the first fingerprint image; and an angle formed by the two line segments drawn from the minutiae point of the first fingerprint.

In this information device, information including the lengths of the two line segments which connect the minutiae point with the closest minutiae point and the second closest minutiae point and the angle formed by the two line segments can be associated with each minutiae point. Therefore, the amount of information associated with minutiae points of a fingerprint image can be reduced, and the load of check processing by using the information can be significantly reduced.

The information device may comprise:

a minutiae point extraction section which extracts a minutiae point of at least the first fingerprint image; and a check section which checks the first fingerprint image with registration information which has been previously registered, wherein:

the comparison section compares the first fingerprint image with the second fingerprint image when the check section has determined that the first fingerprint image is identical with the registration information;

the registration information includes the number of times a line segment connecting minutiae points of a fingerprint image intersects a fingerprint ridge or a fingerprint valley of the fingerprint image; and the check section checks the first fingerprint based on: the registration information; and the number of times a line segment connecting minutiae points of the first fingerprint image intersects a fingerprint ridge or a fingerprint valley of the first fingerprint image.

In this information device, for check is used the number of times a line segment connecting minutiae points intersects a fingerprint ridge or a fingerprint valley of a fingerprint image. Therefore, the amount of information associated with minutiae points of a fingerprint image can be reduced, and the load of check processing by using the information can be significantly reduced.

In the information device, the minutiae point may include at least one of a ridge bifurcation and a ridge ending of a fingerprint.

According to this information device, since minutiae points can be extracted from a fingerprint image by ordinary image processing, the check processing or comparison processing of fingerprint images can be simplified.

In the information device, a frequency in capturing at least the first fingerprint image may be lower than a frequency in capturing the second fingerprint image when the fingerprint image capture section periodically captures a fingerprint image.

In this information device, the capturing frequency (frame frequency) is decreased when capturing the first fingerprint image, and the capturing frequency is increased when capturing the second fingerprint image. Therefore, the frequency can be increased only in the case where a fingerprint image must be captured at high speed in order to follow the movement of the fingerprint image, and the frequency can be decreased in the case where a fingerprint image must not be captured at high speed. Therefore, unnecessary power consumption can be reduced.

In the information device, the fingerprint image capture section may have a detection surface for capturing a fingerprint image, transition to a high speed mode for operating at a first frequency when a finger is in contact with the detection surface, and transition to a low speed mode for operating at a second frequency when a finger is not in contact with the detection surface.

In this information device, since the fingerprint image capture section transitions to the high speed mode only in the case where it is necessary to capture the fingerprint image at high speed, unnecessary power consumption can be reduced.

In the information device, the image generation section may generate an image scrolled based on the comparison result of the comparison section.

In the information device, the image generation section may generate an image having a pointer moved based on the comparison result of the comparison section.

According to this information device, reduction of space of the information device which maintains security protection can be realized even if the display space is greater than the display region of the display section.

According to another embodiment of the present invention, there is provided an information device comprising:

a fingerprint image capture section which captures a fingerprint image;

a comparison section which compares a minutiae point of a first fingerprint image captured by the fingerprint image capture section with a minutiae point of a second fingerprint image captured by the fingerprint image capture section at a given time interval after the first fingerprint image is captured;

an image generation section which generates an image, the comparison result of the comparison section causing the image to be scrolled or a pointer on the image to move; and a display section which displays the image generated by the image generation section.

According to still another embodiment of the present invention there is provided an information device comprising:

a fingerprint image capture section which captures a fingerprint image; and a comparison section which compares a minutiae point of a first fingerprint image captured by the fingerprint image capture section with a minutiae point of a second fingerprint image captured by the fingerprint image capture section at a given time interval after the first fingerprint image is captured, wherein a function of the information device is controlled based on the comparison result of the comparison section.

According to further embodiment of the present invention, there is provided an information device comprising:

a fingerprint image capture section which captures a fingerprint image;

a check section which checks registration information which has been previously registered with a first fingerprint image captured by the fingerprint image capture section, and a comparison section which compares a minutiae point of a first fingerprint image captured by the fingerprint image capture section with a minutiae point of a second fingerprint image captured by the fingerprint image capture section at a given time interval after the first fingerprint image is captured, when the check section has determined that the first fingerprint image is identical with the registration information, wherein a function of the information device is controlled based on the comparison result of the comparison section.

According to this information device, since the function of the information device can be changed according to the change in the minutiae point of the fingerprint image (change in position, for example), operability of multifunctional information device can be improved.

According to yet another embodiment of the present invention there is provided a display control method which controls a display section by means of a captured fingerprint image, the display control method comprising:

capturing a first fingerprint image and then a second fingerprint image at a given time interval after the capture of the first fingerprint image;

comparing the first and second fingerprint images; and changing a display image based on the comparison result of the first and second fingerprint images.

The display control method may comprise:

extracting minutiae points of the first and second fingerprint images; and using a moving directions, a moving distance, and a rotational angle between corresponding two minutiae points of the first and second fingerprint images and changing the display image.

The display control method may comprise:

checking the first fingerprint image with registration information which has been previously registered; and comparing the first and second fingerprint images when the first fingerprint image has been determined to be identical with the registration information.

The display control method may comprise determining whether or not the first fingerprint image is identical with the registration information based on a minutiae point of the first fingerprint image.

The display control method may comprise:

extracting a minutiae point of at least the first fingerprint image;

checking the first fingerprint image with registration information which has been previously registered; and comparing the first fingerprint image with the second fingerprint image when the first fingerprint image has been determined to be identical with the registration information, wherein:

the registration information includes lengths of two line segments and an angle formed by the two line segments, the line segments connecting one minutiae point of the fingerprint image with another minutiae point closest to the minutiae point, and the minutiae point and still another minutiae secondarily closest to the minutiae point; and the first fingerprint is checked based on: the registration information; lengths of two line segments connecting the minutiae point of the first fingerprint image with a minutiae point closest to the minutiae point of the first fingerprint image, and the minutiae point of the first fingerprint image and another minutiae point secondarily closest to the minutiae point of the first fingerprint image; and an angle formed by the two line segments drawn from the minutiae point of the first fingerprint.

The display control method may comprise:

extracting a minutiae point of at least the first fingerprint image; and checking the first fingerprint image with registration information which has been previously registered, wherein:

the registration information includes the number of times a line segment connecting minutiae points of a fingerprint image intersects a fingerprint ridge or a fingerprint valley of the fingerprint image; and the first fingerprint image is checked based on: the registration information; and the number of times a line segment connecting minutiae points of the first fingerprint image intersects a fingerprint ridge or a fingerprint valley of the first fingerprint image.

In the display control method, the minutiae point may include at least one of a ridge bifurcation and a ridge ending of a fingerprint.

In the display control method, a frequency in capturing at least the first fingerprint image may be lower than a frequency in capturing the second fingerprint image when a fingerprint image is periodically captured.

In the display control method, an operating mode may be transitioned to a high speed mode for operating at a first frequency when a finger is in contact with the detection surface, and may be transitioned to a low speed mode for operating at a second frequency when a finger is not in contact with the detection surface.

In the display control method, an image scrolled based on the comparison result may be generated.

In the display control method, an image having a pointer moved based on the comparison results may be generated.

What is claimed is:

1. An information device comprising:
a fingerprint image capture section which captures a fingerprint image;
a comparison section which compares a first fingerprint image captured by the fingerprint image capture section with a second fingerprint image captured by the fingerprint image capture section at a given time interval after the first fingerprint image is captured;
an image generation section which generates an image based on the comparison result of the comparison section;
a display section which displays the image generated by the image generation section;
a minutiae point extraction section which extracts a minutiae point of at least the first fingerprint image; and
a check section which checks the first fingerprint image with registration information which has been previously registered, wherein:
the comparison section compares the first fingerprint image with the second fingerprint image when the check section has determined that the first fingerprint image is identical with the registration information;
the registration information includes the number of times a line segment connecting minutiae points of a fingerprint image intersects a fingerprint ridge or a fingerprint valley of the fingerprint image; and
the check section checks the first fingerprint based on the registration information; and
the number of times a line segment connecting minutiae points of the first fingerprint image intersects a fingerprint ridge or a fingerprint valley of the first fingerprint image.

2. The information device as defined in claim 1, further comprising:
a minutiae point extraction section which extracts minutiae points of the first and second fingerprint images, wherein: the comparison section compares positions of the minutiae points of the first and second fingerprint images; and the image generation section uses a moving directions, a moving distance, and a rotational angle between corresponding two minutiae points of the first and second fingerprint images and generates an image.

3. The information device as defined in claim 2, wherein the minutiae point includes at least one of a ridge bifurcation and a ridge ending of a fingerprint.

4. The information device as defined in claim 1, further comprising:
a check section which checks the first fingerprint image with registration information which has been previously registered, wherein the comparison section compares the first fingerprint image with the second fingerprint image when the check section has determined that the first fingerprint image is identical with the registration information.

5. The information device as defined in claim 4, wherein the check section determines whether or not the first fingerprint image is identical with the registration information based on a minutiae point of the first fingerprint image.

6. The information device as defined in claim 1, further comprising:
a minutiae point extraction section which extracts a minutiae point of at least the first fingerprint image; and
a check section which checks the first fingerprint image with registration information which has been previously registered, wherein:
the comparison section compares the first fingerprint image with the second fingerprint image when the check section has determined that the first fingerprint image is identical with the registration information;
the registration information includes lengths of two line segments and an angle formed by the two line segments, the line segments connecting one minutiae point of the fingerprint image with another minutiae point closest to the minutiae point, and the minutiae point and still another minutiae secondarily closest to the minutiae point; and
the check section checks the first fingerprint image based on: the registration information; lengths of two line segments connecting the minutiae point of the first fingerprint image with a minutiae point closest to the minutiae point of the first fingerprint image, and the minutiae point of the first fingerprint image and another minutiae point secondarily closest to the minutiae point of the first fingerprint image; and
an angle formed by the two line segments drawn from the minutiae point of the first fingerprint.

7. The information device as defined in claim 1, wherein a frequency in capturing at least the first fingerprint image is lower than a frequency in capturing the second fingerprint image when the fingerprint image capture section periodically captures a fingerprint image.

8. The information device as defined in claim 1, wherein the fingerprint image capture section:
has a detection surface for capturing a fingerprint image;
transitions to a high speed mode for operating at a first frequency when a finger is in contact with the detection surface; and
transitions to a low speed mode for operating at a second frequency when a finger is not in contact with the detection surface.

9. The information device as defined in claim 1, wherein the image generation section generates an image scrolled based on the comparison result of the companson section.

10. The information device as defined in claim 1, wherein the image generation section generates an image having a pointer moved based on the comparison result of the comparison section.

11. An information device comprising:
a fingerprint image capture section which captures a fingerprint image;
a comparison section which compares a minutiae point of a first fingerprint image captured by the fingerprint image capture section with a minutiae point of a second fingerprint image captured by the fingerprint image capture section at a given time interval after the first fingerprint image is captured;
an image generation section which generates an image, the comparison result of the comparison section causing the image to be scrolled or a pointer on the image to move;
a display section which displays the image generated by the image generation section;
a minutiae point extraction section which extracts a minutiae point of at least the first fingerprint image; and
a check section which checks the first fingerprint image with registration information which has been previously registered, wherein:
the comparison section compares the first fingerprint image with the second fingerprint image when the check section has determined that the first fingerprint image is identical with the registration information;
the registration information includes the number of times a line segment connecting minutiae points of a fingerprint image intersects a fingerprint ridge or a fingerprint valley of the fingerprint image; and
the check section checks the first fingerprint based on the registration information; and
the number of times a line segment connecting minutiae points of the first fingerprint image intersects a fingerprint ridge or a fingerprint valley of the first fingerprint image.

12. An information device comprising: a fingerprint image capture section which captures a fingerprint image; a comparison section which compares a minutiae point of a first fingerprint image captured by the fingerprint image capture section with a minutiae point of a second fingerprint image captured by the fingerprint image capture section at a given time interval after the first fingerprint image is captured, wherein a function of the information device is controlled based on the comparison result of the comparison section;
a minutiae point extraction section which extracts a minutiae point of at least the first fingerprint image; and
a check section which checks the first fingerprint image with registration information which has been previously registered, wherein:
the comparison section compares the first fingerprint image with the second fingerprint image when the check section has determined that the first fingerprint image is identical with the registration information;
the registration information includes the number of times a line segment connecting minutiae points of a fingerprint image intersects a fingerprint ridge or a fingerprint valley of the fingerprint image; and
the check section checks the first fingerprint based on the registration information; and
the number of times a line segment connecting minutiae points of the first fingerprint image intersects a fingerprint ridge or a fingerprint valley of the first fingerprint image.

13. The display control method as defined in claim 12, wherein an image having a pointer moved based on the comparison results is generated.

14. An information device comprising:
a fingerprint image capture section which captures a fingerprint image;
a check section which checks registration information which has been previously registered with a first fingerprint image captured by the fingerprint image capture section;
a comparison section which compares a minutiae point of a first fingerprint image captured by the fingerprint image capture section with a minutiae point of a second fingerprint image captured by the fingerprint image capture section at a given time interval after the first fingerprint image is captured, when the check section has determined that the first fingerprint image is identical with the registration information, wherein a function of the information device is controlled based on the comparison result of the comparison section;
a minutiae point extraction section which extracts a minutiae point of at least the first fingerprint image; and
a check section which checks the first fingerprint image with registration information which has been previously registered, wherein:
the comparison section compares the first fingerprint image with the second fingerprint image when the check section has determined that the first fingerprint image is identical with the registration information;
the registration information includes the number of times a line segment connecting minutiae points of a fingerprint image intersects a fingerprint ridge or a fingerprint valley of the fingerprint image; and
the check section checks the first fingerprint based on the registration information; and
the number of times a line segment connecting minutiae points of the first fingerprint image intersects a fingerprint ridge or a fingerprint valley of the first fingerprint image.

15. The display control method as defined in claim 14, wherein an image having a pointer moved based on the comparison results is generated.

16. A display control method which controls a display section by means of a captured fingerprint image, the display control method comprising:
capturing a first fingerprint image and then a second fingerprint image at a given time interval after the capture of the first fingerprint image;
comparing the first and second fingerprint images; changing a display image based on the comparison result of the first and second fingerprint images;
extracting a minutiae point of at least the first fingerprint image; and
checking the first fingerprint image with registration information which has been previously registered wherein:
the registration information includes the number of times a line segment connecting minutiae points of a fingerprint image intersects a fingerprint ridge or a fingerprint valley of the fingerprint image; and
the first fingemrint image is checked based on the registration information; and
the number of times a line segment connecting minutiae points of the first fingerprint image intersects a fingerprint ridge or a fingerprint valley of the first fingerprint image.

17. The display control method as defined in claim 16, further comprising:
extracting minutiae points of the first and second fingerprint images; and
using a moving directions, a moving distance, and a rotational angle between corresponding two minutiae points of the first and second fingerprint images and changing the display image.

18. The display control method as defined in claim 17, wherein the minutiae point includes at least one of a ridge bifurcation and a ridge ending of a fingerprint.

19. The display control method as defined in claim 16, further comprising:
checking the first fingerprint image with registration information which has been previously registered; and
comparing the first and second fingerprint images when the first fingerprint image has been determined to be identical with the registration information.

20. The display control method as defined in claim 19, further comprising:
determining whether or not the first fingerprint image is identical with the registration information based on a minutiae point of the first fingerprint image.

21. The display control method as defined in claim 16, further comprising:
extracting a minutiae point of at least the first fingerprint image;
checking the first fingerprint image with registration information which has been previously registered; and
comparing the first and second fingerprint images when the first fingerprint image has been determined to be identical with the registration information, wherein:
the registration information includes lengths of two line segments and an angle formed by the two line segments, the line segments connecting one minutiae point of the fingerprint image with another minutiae point closest to the minutiae point, and the minutiae point and still another minutiae secondarily closest to the minutiae point; and
the first fingerprint is checked based on: the registration information; lengths of two line segments connecting the minutiae point of the first fingerprint image with a minutiae point closest to the minutiae point of the first fingerprint image, and the minutiae point of the first fingerprint image and another minutiae point secondarily closest to the minutiae point of the first fingerprint image; and an angle formed by the two line segments drawn from the minutiae point of the first fingerprint.

22. The display control method as defined in claim 16, wherein a frequency in capturing at least the first fingerprint image is lower than a frequency in capturing the second fingerprint image when a fingerprint image is periodically captured.

23. The display control method as defined in claim 16, wherein: an operating mode is transitioned to a high speed mode for operating at a first frequency when a finger is in contact with the detection surface, and transitioned to a low speed mode for operating at a second frequency when a finger is not in contact with the detection surface.

24. The display control method as defined in claim 16, wherein an image scrolled based on the comparison result is generated.

25. The display control method as defined in claim 16, wherein an image having a pointer moved based on the comparison results is generated.

* * * * *